United States Patent
Rubin et al.

(10) Patent No.: US 10,859,394 B2
(45) Date of Patent: Dec. 8, 2020

(54) CUSTOMIZING VISUALIZATION IN A NAVIGATION APPLICATION USING THIRD-PARTY DATA

(71) Applicant: GOOGLE LLC, Mountain View, CA (US)

(72) Inventors: Izaak Lansky Rubin, Pyrmont (AU); Holger-Frederik Flier, Zurich (CH); Sara Torti, Portola Valley, CA (US)

(73) Assignee: GOOGLE LLC, Mountain View, CA (US)

( * ) Notice: Subject to any disclaimer, the term of this patent is extended or adjusted under 35 U.S.C. 154(b) by 165 days.

(21) Appl. No.: 16/220,876

(22) Filed: Dec. 14, 2018

(65) Prior Publication Data

US 2019/0186942 A1 Jun. 20, 2019

Related U.S. Application Data

(60) Provisional application No. 62/599,346, filed on Dec. 15, 2017.

(51) Int. Cl.
| | | |
|---|---|---|
| *G01C 21/36* | (2006.01) | |
| *G01C 21/34* | (2006.01) | |
| *G06Q 50/30* | (2012.01) | |
| *G08G 1/00* | (2006.01) | |

(52) U.S. Cl.
CPC ..... *G01C 21/3614* (2013.01); *G01C 21/3423* (2013.01); *G01C 21/3438* (2013.01); *G01C 21/3626* (2013.01); *G01C 21/3697* (2013.01); *G06Q 50/30* (2013.01); *G08G 1/202* (2013.01)

(58) Field of Classification Search
CPC ............ G01C 21/3614; G01C 21/3626; G01C 21/3423; G01C 21/3438; G01C 21/3697; G06Q 50/30; G08G 1/202
See application file for complete search history.

(56) References Cited

U.S. PATENT DOCUMENTS

| | | |
|---|---|---|
| 9,791,291 B1 | 10/2017 | Yamashita et al. |
| 2006/0238379 A1 | 10/2006 | Kimchi et al. |
| 2011/0141141 A1 | 6/2011 | Kankainen |
| (Continued) | | |

FOREIGN PATENT DOCUMENTS

WO    WO-2017/088828 A1    6/2017

OTHER PUBLICATIONS

International Search Report and Written Opinion for Application No. PCT/US2018/0655647, dated Mar. 26, 2019.

(Continued)

*Primary Examiner* — Marthe Y Marc-Coleman
(74) *Attorney, Agent, or Firm* — Marshall, Gerstein & Borun LLP

(57) ABSTRACT

An interactive digital map is provided via a user interface of a computing device. A request to obtain travel directions to a destination is received via the user interface. An indication of a ride from a pick-up location to a drop-off location, to traverse at least a portion of the route, is obtained from a third-party provider of a ride service. Visualization information for rendering a visualization of the ride on the digital map also is received from the third-party provider of the ride service. The visualization of the ride on the digital map is generated in accordance with the received visualization information.

20 Claims, 17 Drawing Sheets

(56) References Cited

U.S. PATENT DOCUMENTS

| | | | |
|---|---|---|---|
| 2014/0040079 A1* | 1/2014 | Smirin | G06Q 30/0641 |
| | | | 705/27.1 |
| 2014/0257697 A1 | 9/2014 | Gishen | |
| 2015/0153933 A1 | 6/2015 | Filip et al. | |
| 2015/0178257 A1 | 6/2015 | Jones et al. | |
| 2015/0339923 A1* | 11/2015 | Konig | G08G 1/202 |
| | | | 701/522 |
| 2016/0298977 A1 | 10/2016 | Newlin et al. | |
| 2017/0059347 A1* | 3/2017 | Flier | G06Q 10/08355 |
| 2017/0227367 A1 | 8/2017 | Thangaraj et al. | |
| 2017/0356749 A1 | 12/2017 | Shelby et al. | |
| 2018/0189920 A1* | 7/2018 | Li | G06F 3/0482 |
| 2019/0130745 A1* | 5/2019 | Turato | G08G 1/202 |

OTHER PUBLICATIONS

International Search Report and Written Opinion for Application No. PCT/US2018/065589, dated Mar. 29, 2019.
International Search Report and Written Opinion for Application No. PCT/US2018/065593, dated Mar. 25, 2019.
International Search Report and Written Opinion for Application No. PCT/US2018/065643, dated Apr. 5, 2019.

* cited by examiner

CUSTOMIZING VISUALIZATION IN A NAVIGATION APPLICATION USING THIRD-PARTY DATA

CROSS-REFERENCE TO RELATED APPLICATION

The present application is a non-provisional application claiming priority to U.S. Provisional Patent Application No. 62/599,346, filed Dec. 15, 2018, the disclosure of which is incorporated herein by reference in its entirety for all purposes.

FIELD OF THE DISCLOSURE

The present disclosure relates to inter-application communication, and more particularly, to inter-application communication between a mapping application and a ride service application.

BACKGROUND

Today, digital maps of geographic areas are commonly displayed on computing devices, such as computers, tablets, and mobile phones via mapping applications, web browsers, etc. Many mapping applications provide the user with the ability to select the type of map information or features for viewing as well as to adjust the display of the digital map.

Additionally, mapping application providers offer application programming interfaces (APIs) for accessing map and navigation data to display digital maps and provide step-by-step navigation directions to a destination location. For example, a ride service application may invoke a mapping application API to provide a digital map of a geographic area that includes a pick-up location for the user, a destination location, navigation directions for travelling to the destination location, etc.

SUMMARY

To provide ride services within a mapping application without directing the user to a separate ride service application, the mapping application invokes one or several ride service APIs to access ride service data from various ride service providers. For example, a user may request navigation directions within the mapping application to a destination location. The user may then select from several modes of transportation for travelling to the destination location, including a ride service mode. When the user selects the ride service mode, the mapping application may communicate with various ride service applications by invoking respective ride service APIs. The mapping application communicates with the ride service applications and/or ride service servers to retrieve indications of the types of ride services provided by each of the ride service providers. Types of ride services may include a carpooling ride service, where the ride service providers picks up additional passengers on the way to the user's destination, a taxi service that does not pick up additional passengers on the way to user's destination, a limo service that includes additional features within the vehicle, an extra-large vehicle service for picking up large groups of passengers, etc. The mapping application may also communicate with the ride service applications to retrieve price estimates for each type of ride service, wait times for each type of ride service, ride durations for each type of ride service, ride status information regarding the status of trip (e.g., waiting for the driver to accept the ride, waiting for the driver to arrive at the pick-up location, ride in progress, ride completed), a number of vehicles within a geographic area surrounding the user's current location, etc. In some scenarios, ride service applications do not need to be downloaded to the user's client device and instead the mapping application invokes the respective ride service APIs to communicate with ride service servers.

The user may then select a ride service provider and type of ride service directly from the mapping application to order transportation services to her destination location. In this manner, a user may select from several candidate ride service providers within the mapping application without having to open each of the corresponding ride service applications for comparison and without leaving the mapping application. Moreover, a user may identify pick-up locations and destination locations in an application that has built-in map functionality. For example, the user may view a three-dimensional street level view of the area around the pick-up location, so that the user may easily find the driver at the pick-up location. The mapping application may also provide recommendations on pick-up locations based on the context and location of the user as well as walking directions from the user's current location to the pick-up location.

In particular, an example embodiment of the techniques of the present disclosure is a method in a computing device for providing multi-modal travel directions. The method includes receiving, via a user interface, a request to obtain travel directions to a destination and generating multi-modal travel directions for traveling to the destination. Generating the multi-modal travel directions includes obtaining, from a third-party provider of a ride service, an indication of a ride to traverse a first segment of the route between a pick-up location and a drop-off location, the ride service defining a first mode of transport, and obtaining navigation directions to traverse a second segment of the route using a second mode of transport different from the first mode. The method further includes providing an indication of the generated multi-modal directions via the user interface.

Another example embodiment is a computing device including a user interface, one or more processors, and a non-transitory computer readable medium storing instructions thereon. When executed by the one or more processors, the instructions cause the computing device to receive, via the user interface, a request to obtain travel directions to a destination, and generate multi-modal travel directions for traveling to the destination. To generate the multi-modal travel directions, the instructions cause the computing device to obtain, from a third-party provider of a ride service, an indication of a ride to traverse a first segment of the route between a pick-up location and a drop-off location, the ride service defining a first mode of transport and obtain navigation directions to traverse a second segment of the route using a second mode of transport different from the first mode. The instructions further cause the computing device to provide an indication of the generated multi-modal directions via the user interface.

Yet another example embodiment is a method in a computing device for providing multi-modal travel directions. The method includes providing an interactive digital map via a user interface, receiving, via the user interface, a request to obtain travel directions to a destination, and obtaining, from a third-party provider of a ride service, an indication of a ride from a pick-up location to a drop-off location to traverse at least a portion of the route. The method further includes receiving, from the third-party provider of the ride service, visualization information for rendering a visualization of the ride on the digital map, and generating the visualization of the ride on the digital map in accordance with the received visualization information.

Another example embodiment is computing device including a user interface, one or more processors, and a non-transitory computer readable medium storing instructions thereon. When executed by the one or more processors, the instructions cause the computing device to provide an interactive digital map via a user interface, receive, via the user interface, a request to obtain travel directions to a destination, and obtain, from a third-party provider of a ride service, an indication of a ride from a pick-up location to a drop-off location to traverse at least a portion of the route. The instructions further cause the computing device to receive, from the third-party provider of the ride service, visualization information for rendering a visualization of the ride on the digital map, and generate the visualization of the ride on the digital map in accordance with the received visualization information.

Another example embodiment is a method in a portable computing device for providing ride service information a digital map. The method includes providing, via a user interface, an interactive digital map of a geographic area, receiving, via the user interface, a request to obtain travel directions to a destination, and requesting from a plurality of third-party providers of ride services, respective indications of candidate rides for at least a portion of a route to the destination, each of the indications including a pick-up location, a price estimate, and pick-up time. The method further includes, receiving the requested indications of the candidate rides, determining a ranking the candidate rides according to at least one of price and pick-up time, providing, on the digital map, a listing of the candidate rides in accordance with the determined ranking, and in response to one of the candidate rides being selected via the user interface, transmitting a request for the selected ride to the corresponding third-party provider.

Yet another example embodiment is a method in a portable computing device for providing map data related to a ride service on a computing device. The method includes providing an interactive two-dimensional digital map via a user interface, receiving, via the user interface, a request to obtain travel directions to a destination, and obtaining from a third-party provider of a ride service, an indication of a ride from a pick-up location to a drop-off location to traverse at least a portion of the route. The method further includes obtaining street-level imagery for the pick-up location, displaying the obtained street-level imagery for the pick-up location on the digital map, and in response to detecting a selection of the street-level imagery via the user interface, transitioning the two-dimensional digital map to an interactive three-dimensional panoramic display of street-level imagery.

DETAILED DESCRIPTION

Overview

Figure 1:
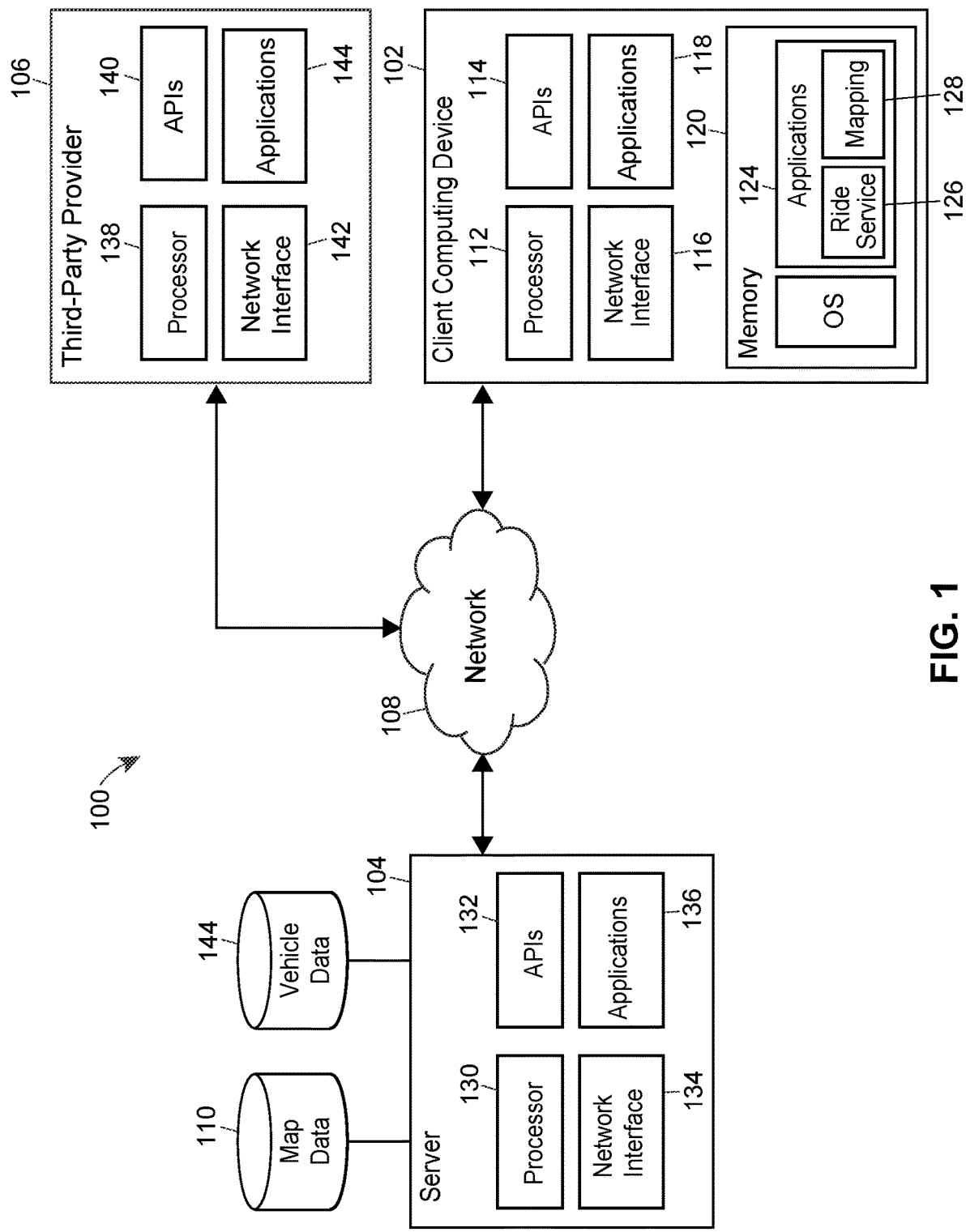
FIG. 1 is a block diagram of an example system in which techniques for providing ride services via a mapping application to a portable device can be implemented.

Generally speaking, techniques for providing ride services within a mapping application can be implemented in a mapping application operating in a portable computing device or a wearable device, one or several network servers, or a system that includes a combination of these devices. However, for clarity, the examples below focus primarily on an embodiment in which a user requests ride services via a mapping application within a portable computing device. The mapping application invokes one or several ride service APIs to communicate with respective ride service applications and/or ride service servers. The mapping application may also communicate with a map data server and/or a navigation data server to retrieve map and navigation data for displaying an interactive two-dimensional digital map of a geographic area surrounding the user's current location and navigation directions to a destination location (also referred to herein as a "drop-off location") selected by the user.

The mapping application may then display ride service data for one or several ride service providers including the types of ride services offered by each ride service provider, price estimates for each type of ride service, wait times for each type of ride service, ride durations for each type of ride service, vehicles within a geographic area surrounding the user's current location, etc.

When the user selects a ride service provider and type of ride service, the mapping application may prompt the user to select a pick-up location. In some embodiments, the mapping application provides a default pick-up location near the user's current location and the user may adjust the pick-up location via user controls. Also in some embodiments, the mapping application may provide a recommended pick-up location based on the user's current location and context information. For example, in an area with several one-way streets, the mapping application may recommend a pick-up location at a street that allows drivers to travel in the direction of the destination location, so that the driver does not need to make unnecessary turns after picking up the user. In another example, the recommended pick-up location may be determined based on traffic to avoid streets with heavy traffic in order to minimize cost.

In response to receiving a selection of the pick-up location, the mapping application may invoke a ride service API corresponding to the selected ride service provider and provide rider identification information for the user, the requested pick-up location, and the type of ride service to the corresponding ride service application. The ride service application may then provide a ride identifier, an updated wait time, updated price estimate, updated ride duration, and driver identification information for display on the mapping application via the ride service API. As a result, a driver may pick-up the user at the requested pick-up location and drop the user off at the destination location.

Example Hardware and Software Components

Referring to FIG. 1, an example communication system 100 in which the techniques outlined above can be implemented includes a client computing device 102, such as a portable device configured to execute one or several ride service applications 126 and a mapping application 128. In addition to the client computing device 102, the communication system 100 includes a server device 104, such as a navigation server device configured to provide a map display and navigation data to the client computing device 102. The communication system 100 also includes a third-party provider device 106 (which operates independently and separately from the server device 104) that may be configured to communicate with the client computing device 102 and the server device 104 for the purposes of providing ride service functionality. The client computing device 102, the server device 104, and the third-party provider device 106 may be communicatively connected to each other through a network 108. The network 108 may be a public network, such as the Internet, or a private network such as an intranet.

The server device 104 can be communicatively coupled to a database 110 that stores, in an example implementation, map data for various geographic areas. Similarly, the server device 104 can be communicatively coupled to a database 144 that stores, in an example implementation, vehicle data 144 for various vehicles associated with a user of the client computing device 102, vehicles associated with the third-party provider 106, other vehicles whose data is collected by the server device 104, or other servers, or combinations of all three. More generally, the server device 104 can communicate with one or several databases that store any type of suitable geospatial information or information that can be linked to a geographic context, such as coupons or offers. The server device 104 can also be communicatively coupled to a database (not shown) that stores, in an example implementation, navigation data including step-by-step navigation directions such as driving, walking, biking, or public transit directions, for example, that may be ultimately utilized by both the ride service application 126, the mapping application 128, or both. For example, the server device 104 may request and receive map data from the map data database 110 as well as relevant vehicle data from the vehicle data database 144. In some implementations the server device 104 may include several communicatively connected server devices. Similarly, the map data and the vehicle data, stored in the databases 110 and 144 respectively, may in fact be several databases communicatively connected in a cloud database configuration.

In an example implementation, the client computing device 102 may be a smart phone or a tablet computer, for example, and includes a memory 120, one or more processors 112, a network interface 116, a user interface (UI) 114 and one or several sensors 118. The memory 120 can be a non-transitory memory and can include one or several suitable memory modules, such as random access memory (RAM), read-only memory (ROM), flash memory, other types of persistent memory, etc. The UI 114 may be a touch screen, for example. More generally, the techniques of this disclosure can be implemented in other types of devices, such as laptop or desktop computers, a device embedded in a vehicle such as a vehicle head unit, wearable devices, such as smart watches or smart glasses, etc.

Depending on the implementation, the one or more sensors 118 can include a global positioning system (GPS) module to detect the position of the client computing device 102, a compass to determine the direction of the client computing device 102, a gyroscope to determine the rotation and tilt, an accelerometer, etc.

The memory 120 stores an operating system (OS) 122, which can be any type of suitable mobile or general-purpose operating system. The OS 122 can include API functions that allow applications (such as the ride service application 126 and the mapping application 128) to interface with each other, or to retrieve, for example, sensor readings. For example, a software application configured to execute on the client computing device 102 can include instructions that invoke an OS 122 API for retrieving a current location and orientation of the client computing device 102 at that instant. The API can also return a quantitative indication of how certain the API is of the estimate (e.g., as a percentage).

The memory 120 also stores the mapping application 128, which is configured to generate interactive digital maps. The mapping application 128 can receive map data in a raster (e.g., bitmap) or non-raster (e.g., vector graphics) format from the map data database 110 and/or the server device 104. In some cases, the map data can be organized into layers, such as a basic layer depicting roads, streets, natural formations, etc., a traffic layer depicting current traffic conditions, a weather layer depicting current weather conditions, a navigation layer depicting a path to reach a destination, etc. The mapping application 128 also can display navigation directions from a starting location to a destination location. The navigation directions may include driving, walking, or public transit directions.

It is noted that although FIG. 1 illustrates the mapping application 128 as a standalone application, the functionality of the mapping application 128 also can be provided in the form of an online service accessible via a web browser executing on the client computing device 102, as a plug-in or extension for another software application executing on the client computing device 102, etc. The mapping application 128 generally can be provided in different versions for different respective operating systems. For example, the maker of the client computing device 102 can provide a Software Development Kit (SDK) including the mapping application 128 for the Android™ platform, another SDK for the iOS™ platform, etc.

In some implementations, the server device 104 includes one or more processors 130, APIs 132, a network interface 134, and a memory 136. The APIs 132 may provide functions for interfacing with applications that may be stored in the memory 136 on the server device 104. The memory 136 may be tangible, non-transitory memory and may include any types of suitable memory modules, including random access memory (RAM), read-only memory (ROM), flash memory, other types of persistent memory, etc. The memory 136 stores instructions executable on the processors 130 which can generate map displays to be displayed by the mapping application 128 for a geographic area. The memory 136, or the memory in another server, similarly can store instructions that generate navigation directions to a geographic location within the geographic area and which may be displayed overlaying the map display by the mapping application 128. In some implementations, the third-party provider 106 may initiate calls to the server device 104 for navigations directions that may be used by the ride service application 126 on the client computing device 102.

For simplicity, FIG. 1 illustrates the server device 104 as only one instance of a server. However, the server device 104 according to some implementations includes a group of one or more server devices, each equipped with one or more processors and capable of operating independently of the other server devices. Server devices operating in such a group can process requests from the client computing device 102 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

In some implementations, the third-party provider device 106 or ride service provider device may include processors 138, APIs 140, a network interface 142, and a memory 144. The APIs 140 may provide functions for interfacing with applications that may be stored in the memory 144 on the third-party provider 106. The memory 144 may be tangible, non-transitory memory and may include any types of suitable memory modules, including random access memory (RAM), read-only memory (ROM), flash memory, other types of persistent memory, etc. The memory 144 stores instructions executable on the processors 138 which can generate, handle, and transmit requests for ride service functions in a ride service application, such as the ride service application 126 stored in the memory 120 of the client computing device 102.

In some implementations, the system 100 includes several third-party provider devices 106 corresponding to several different ride service providers. Also in some instances, the client computing device 102 includes several ride service applications 126 corresponding to each of the ride service providers. In this manner, a user may compare ride service types, price estimates, ride durations, and estimated wait times for several ride service providers.

Figure 2:
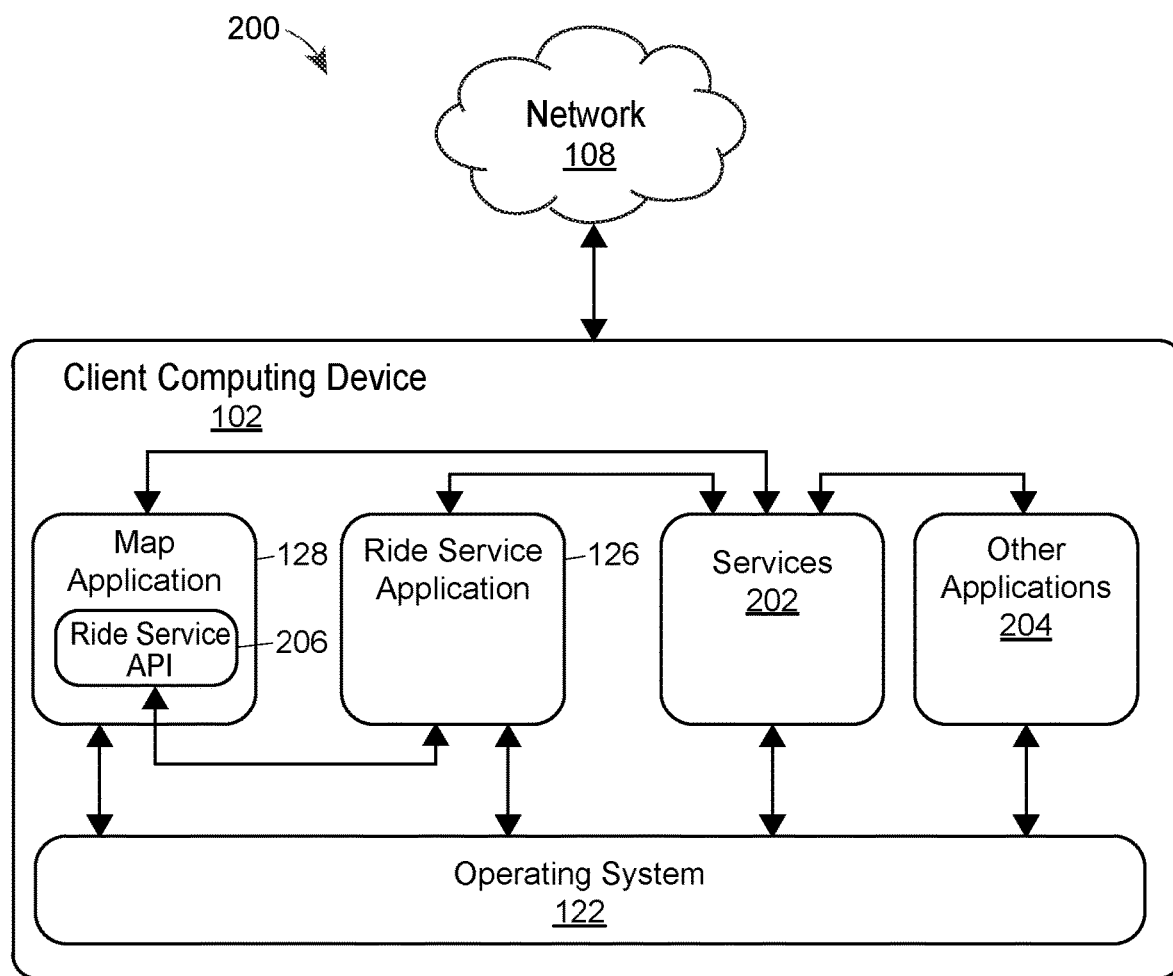
FIG. 2 is a block diagram of an example portable device that can operate in the system of FIG. 1.

FIG. 2 is a block diagram of an example software architecture 200 which may be implemented on the client computing device 102, and may include protocols for communicating between the operating system 122, the ride service application 126, the mapping application 128, services 202 on the client computing device, as well as other applications 204. In some implementations, the ride service application exposes a ride service API 206 that is invoked by the mapping application 128. In this manner, the mapping application 128 may allow users to request ride services without having to leave the mapping application 128. For example, the mapping application 128 may provide pick-up and destination locations to the ride service API 206, which may in turn provide the types of ride services in the geographic area, price estimates for each type of ride service, wait times for each type of ride service, ride durations for each type of ride service, a number of vehicles within the geographic area, etc.

In general, the mapping application 128 may make function calls to the ride service application 126 or a ride service server 106 by accessing the ride service API 206. The API 206 facilitates inter-application communication and allows the mapping application 128 and ride service application 126 to maintain control over how processes, logic, and users are handled while still exposing functionality to other applications. The applications 126 and 128 can communicate using an inter-process communication (IPC) scheme provided by the operating system 122. In some embodiments of the client computing device 102, the functionality of the ride service application 126 can be provided as a static library of functions accessible via the ride service API 208. In other words, some or all of functions of the ride service application 126 can execute as part of the mapping application 128. More generally, the ride service API 208 provides, to the mapping application 128, access to a ride service using any suitable software architecture and communication schemes, including those currently known in the art. The ride service API 208 generally can be provided in different versions for different respective operating systems. For example, the maker of the client computing device 102 can provide a Software Development Kit (SDK) including the ride service API 208 for the Android™ platform, another SDK for the iOS™ platform, etc.

In some instances, the mapping application 128 may communicate with several ride service applications via respective APIs. If the user does not have a ride service application that the mapping application 128 communicates with, the user may be prompted to download the ride service application 126. In other embodiments, the user does not download the ride service application 126 and the mapping application 128 may communicate with a ride service server, such as the third-party provider device 106 as shown in FIG. 1, via the ride service API 206.

Figure 3:
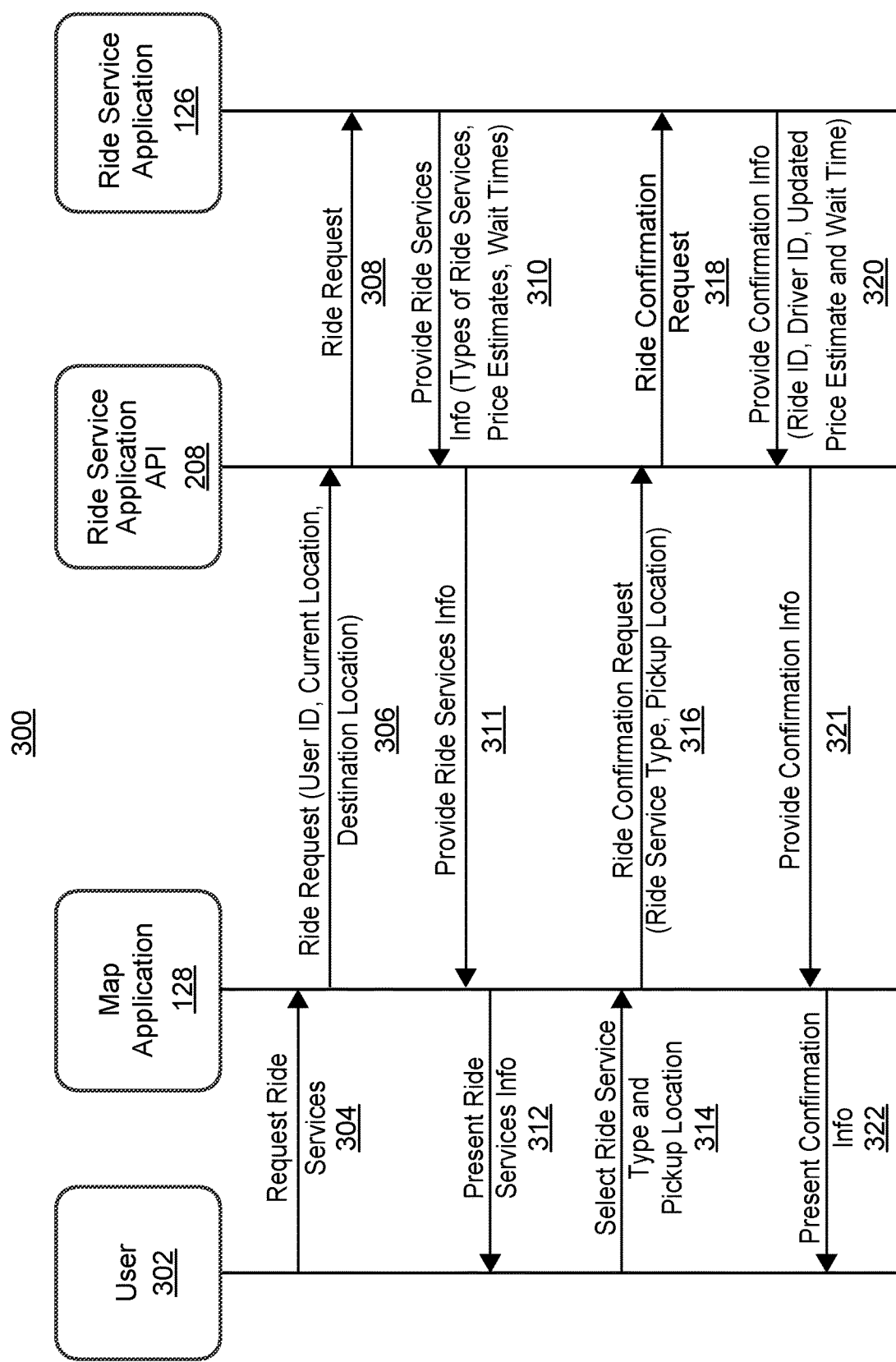
FIG. 3 is an exemplary sequence diagram that illustrates an example exchange of information between a mapping application and a ride service application in response to user input provided to the mapping application.

FIG. 3 is an exemplary sequence diagram 300 depicting calls between a mapping application and a ride service application utilizing APIs. The sequence diagram 300 illustrates an example message sequence chart for one implementation of the embodiments disclosed herein. The sequence diagram 300 includes a user 302, a mapping application 128, a ride service application 126, and a ride service API 208.

In the example sequence diagram 300, the user 302 requests ride services 304 via user controls on a display presented by the mapping application 128. For example, the user may request directions to a selected destination location for a ride services mode of transportation. In response to the request, the mapping application 128 may generate an API call for ride services to the ride service application API 208, where the API call includes a request for ride services along with the current location of the user and the destination location 306, for example. The API call is then sent as a request 308 to a ride service application 126 or a ride service server, such as the third-party provider device 106.

The ride service application 126 may perform its own internal functions to determine the types of ride services available to service the user 302, price estimates for transporting the user 302 to the destination location, wait times for picking up the user 302, a number of vehicles within a geographic area surrounding the user's current location, etc. The ride service application 126 then prepares a response 310 to be sent to the mapping application 128 with, for example, types of ride services available, an estimated time for arrival of a ride through each type of ride service, an estimated price for each type of ride service, an estimation of the vehicles/drivers in the area, or combinations thereof. The response 310 is received by the ride service API 208 and then formatted and provided to the mapping application 128 (ref. no. 311) where it is handled, and manipulated if necessary, into for display 312 to the user 302.

For example, the mapping application 128 may display indications of each type of ride service available (e.g., a carpooling ride service, a taxi ride service, a limo ride service, an extra-large vehicle service), a price estimate for each type of ride service, a ride duration for each type of ride service, and an estimated wait time for each type of ride service. The mapping application 128 may also display indications of vehicles on the map display in proportion to the number of vehicles within the geographic area, as indicated by the ride service API 126. While the locations of the vehicles on the map display may not be an accurate representation of the locations of the vehicles employed by the ride service provider, the number of vehicles on the map display may be used to show the user an approximation of the amount of vehicles in the area. When multiple ride service providers are available, the mapping application 128 may display the indications of vehicles employed by each ride service provider in a different style or color.

In some embodiments, the displayed indications of available types of ride services may include selectable user controls for selecting a type of ride service. The user 302 views the displayed indications 312 and selects a type of ride service. The mapping application 128 may then present a user control for selecting a pick-up location. The user control may be a pin placed at the user's current location or a nearby the user's current location and the user may be able to move the pin to another location, by entering an address or point of interest (POI), dragging the pin to another location, or in any other suitable manner. The pick-up location and selected type of ride service are then provided to the ride service API 208 (ref. no. 316) and forwarded to the ride service application 126 (ref. no. 318). The ride service application 126 then selects a driver for picking up and the user and transmits driver identification information for the selected driver (e.g., the name of the driver, the vehicle make, model, and color, a license plate number, etc.), an updated price estimate, an updated wait time, a ride ID for retrieving status information indicating that the driver is on the way to pick-up the user, etc. to the ride service API 208 (ref. no. 320) which is then formatted and provided to the mapping application 128 (ref. no. 321). Accordingly, the mapping application 128 may present an indication of the status of the driver (e.g., on the way to pick-up the user), the updated price estimate, the updated wait time, and the driver identification information to the user 302.

Figure 4:
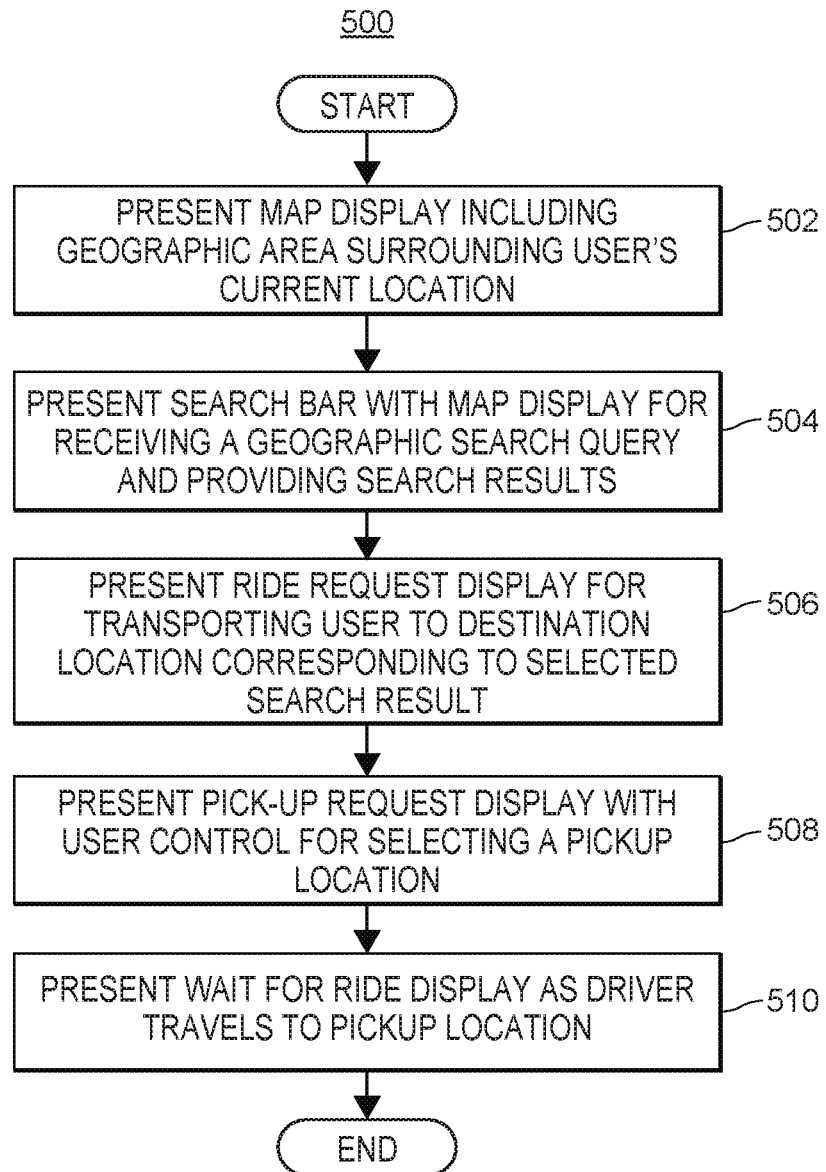
FIG. 4 is an exemplary flow diagram for transitioning between user interfaces during a ride service request within a mapping application.

FIG. 4 illustrates an exemplary flow diagram 500 for transitioning between user interfaces during a ride service request within a mapping application 128. The method may be implemented in a set of instructions stored on a computer-readable memory and executable on one or more processors of the client computing device 102. For example, the method can be implemented by the mapping application 128, the ride service application 128, or any suitable combination of these.

At block 502, a map display is presented that includes a geographic area surrounding the user's current location. An indication of the user's current location may also be presented on the map display. Then at block 504, the mapping application 128 presents a search bar for obtaining a geographic search query from a user and providing search results in response to the geographic search query. For example, the search results may include POIs, addresses, intersections, etc., and the user may select one of the search results as a destination location and request directions to the selected destination location.

The mapping application 128 may also include user controls for selecting between several modes of transportation, including a ride services mode of transportation. In response to receiving a selection of the ride service mode of transportation, the mapping application 128 may present a ride request display (block 506) including indications of ride service providers, types of ride services from the ride service providers, price estimates for each type of ride service, ride durations for each type of ride service, wait times for each type of ride service, etc., similar to the display as shown in FIG. 11B. In some embodiments, the mapping application 128 may invoke a ride service API for each of one or several ride service applications and may provide the user's current location and destination location to each of the ride service applications via the respective APIs.

Figure 12A:
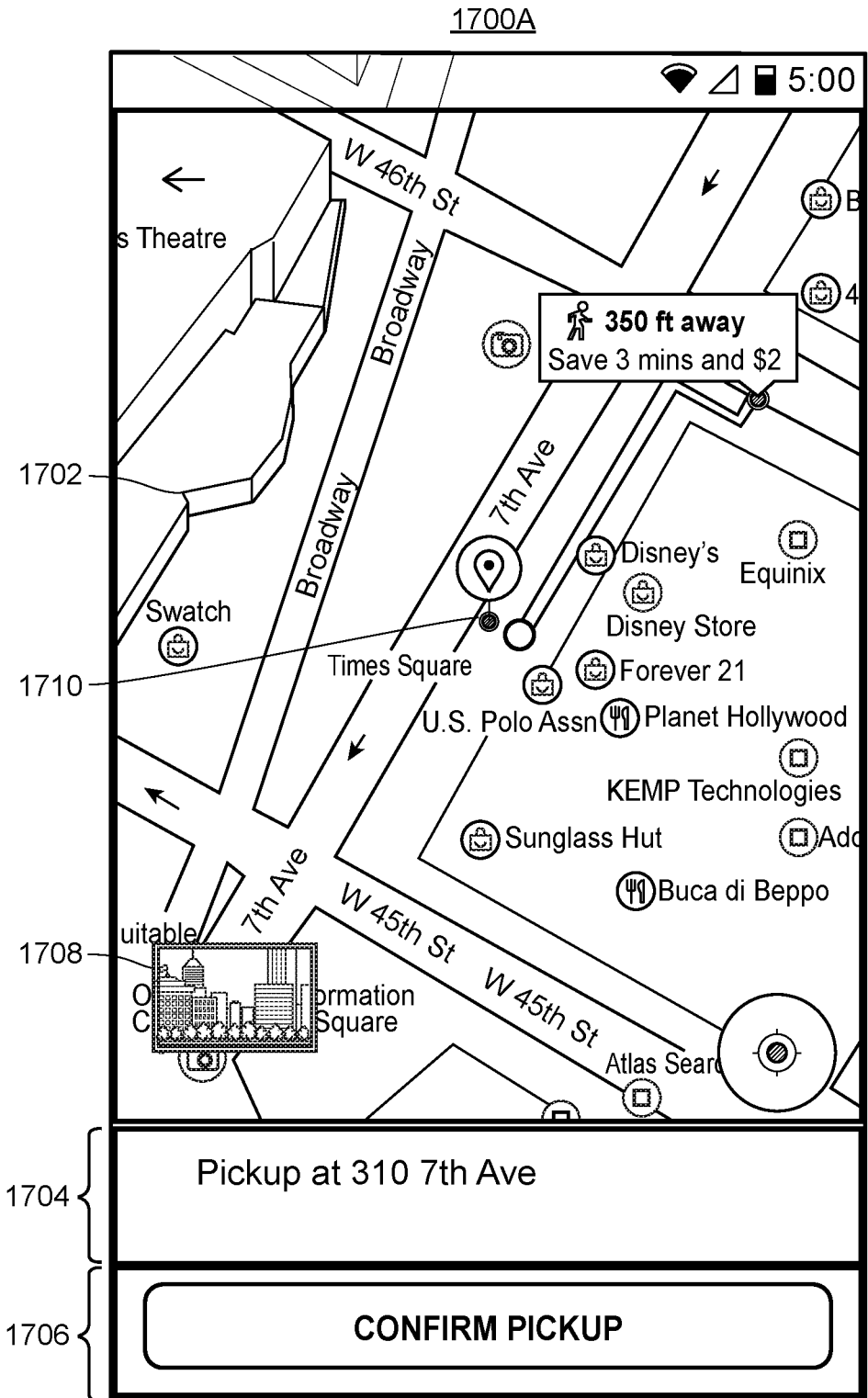
FIG. 12A is an exemplary pick-up request display for confirming a ride in a mapping application.

In response to receiving a selection of a ride service provider and/or type of ride service, the mapping application 128 may present a pick-up request display (block 508) that includes a user control for selecting a pick-up location, similar to the display as shown in FIG. 12A. The pick-up request display may include a default pick-up location within a threshold distance of the user's current location (e.g., 500 feet), where the default pick-up location is adjustable by the user. For example, the user may enter in the pick-up location or drag a pin presented at the default pick-up location to select the pick-up location. In some embodiments, the mapping application 128 may provide a recommended pick-up location to save time and money. For example, the recommended pick-up location may be 350 feet from the user's current location, and the pick-up request display may indicate that the user can "Save 3 mins and $2" by selecting the recommended pick-up location. The pick-up request display may also include a user control for confirming the pick-up location, such as a "Confirm Pick-up" button after selecting the pick-up location.

Figure 13A:
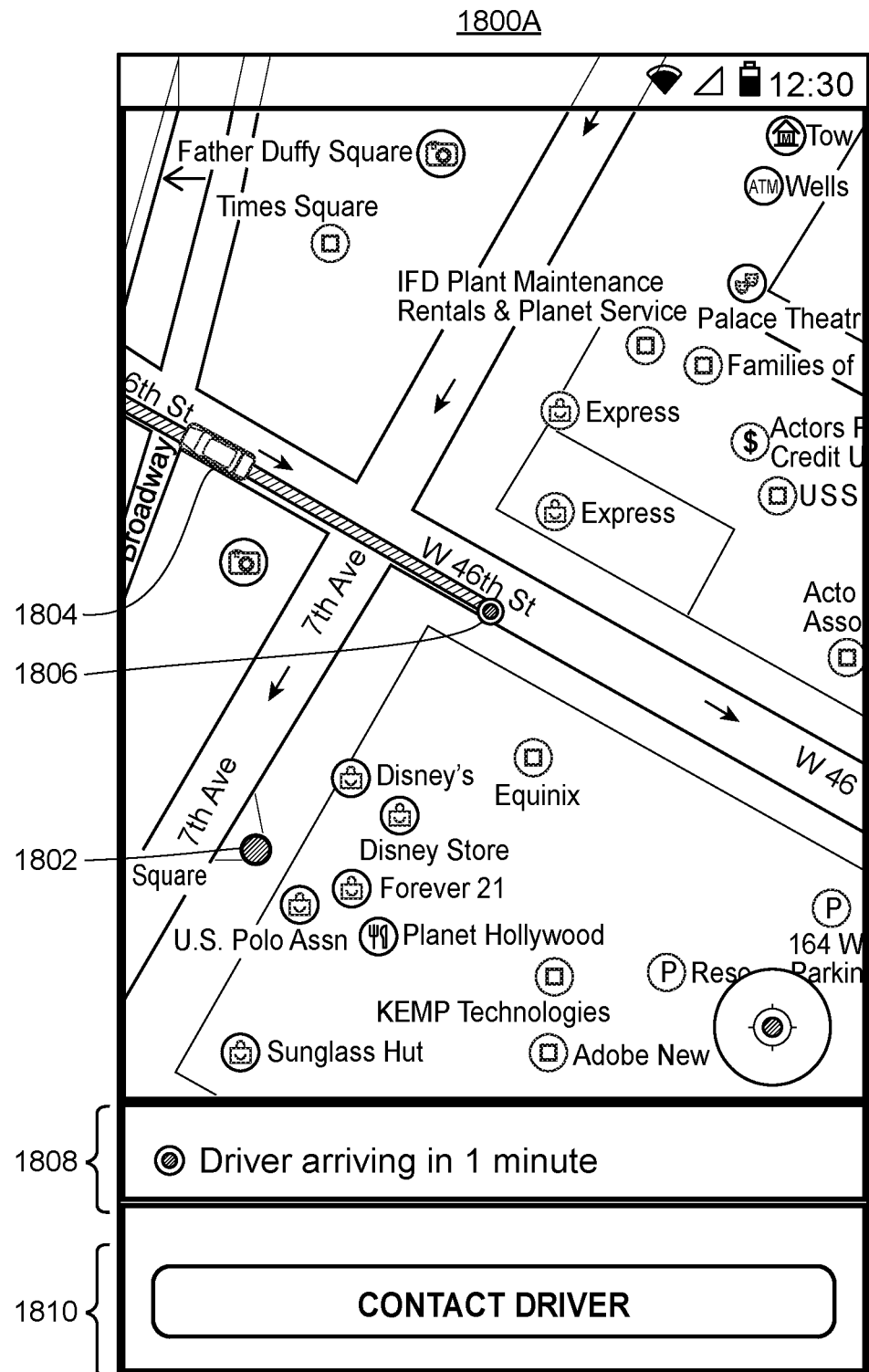
FIG. 13A is an exemplary wait for ride display presented when the user waits to be picked up by a ride service provider in a mapping application.

In response to receiving a selection of a pick-up location, the mapping application 128 may present a wait for ride display (block 510), similar to the display as shown in FIG. 13A. The wait for ride display may include an indication of the driver's current location, identification information for the driver, an estimated wait time for the driver to arrive at the selected pick-up location, and a user control for contacting the driver. Once the driver arrives, the user may be transported to the destination location.

When the user requests ride services within the mapping application 128, the mapping application 128 provides user login information to a ride service provider to login the user to a user profile maintained by the ride service provider. For example, the user profile may include payment methods for the user, the name of the user, an email address of the user, a phone number of the user, a picture of the user for the driver to identify the user, a rating of the user, a ride ID for a ride currently in progress or ride the user is requesting, or any other suitable user profile information. Once the user confirms a ride request, the mapping application 128 may receive a ride ID for retrieving status information for the ride, such as "Waiting for the driver to accept the ride request," "Waiting for the driver to arrive at the pick-up location," "Ride in progress," and "Ride completed."

Figure 5:
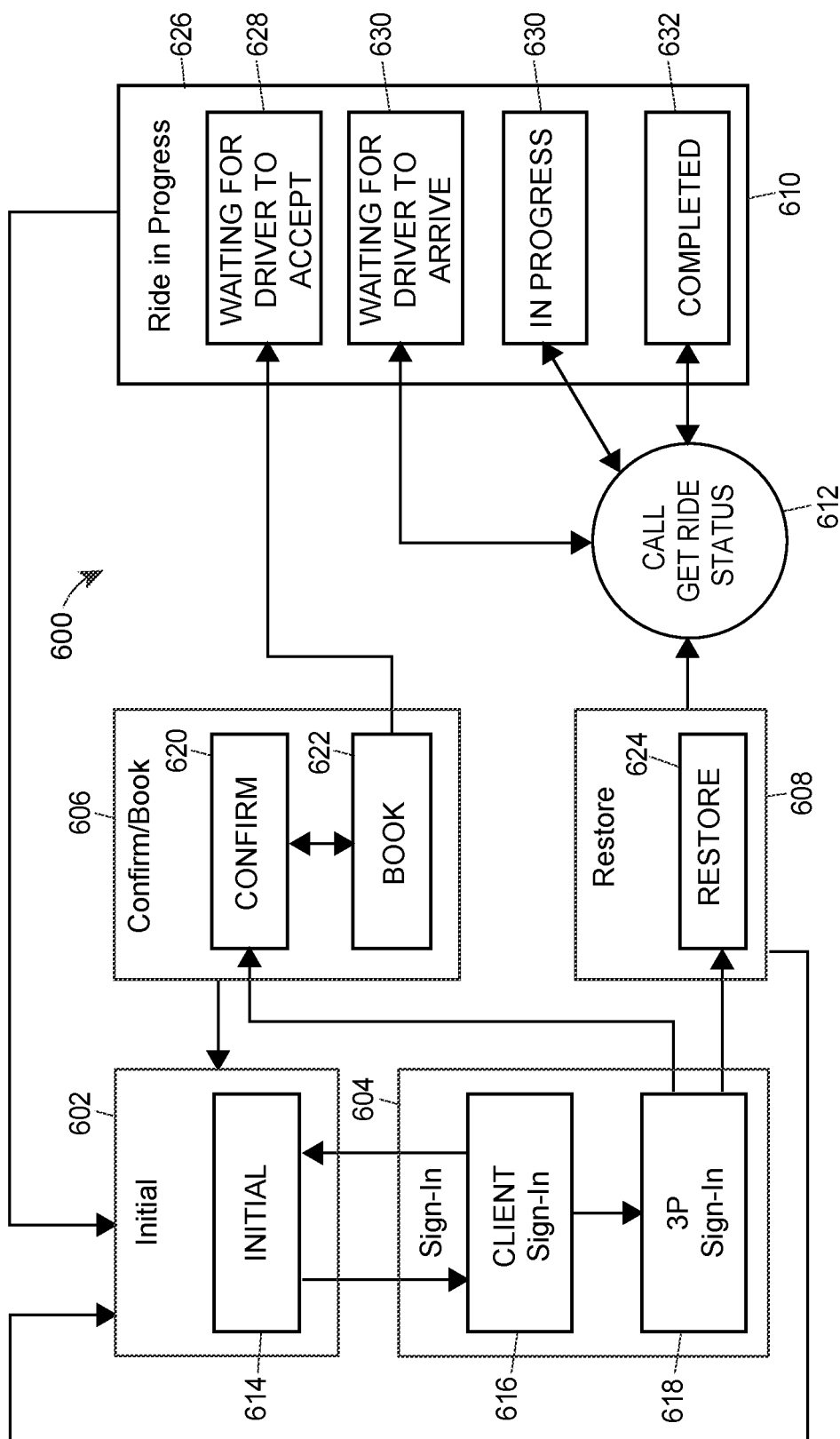
FIG. 5 is an exemplary state diagram for requesting ride services via a mapping application by invoking a ride service API.

FIG. 5 is an exemplary state diagram 600 for requesting ride services via the mapping application 128 by invoking the ride service API 208. The state diagram 600 depicts several states, such as an initial state 602, a sign-in state 604, a confirm/book state 606, a restore state 608, a ride in progress state 610, and a transition state 612. At any moment any of the states 602-610 may return to the initial state as denoted in the state diagram 600.

In one implementation, a user opens a mapping application 128 and begins in the initial state 602. In the initial state 602, the mapping application 128 presents a map display of a geographic area and may receive geographic search queries, provide search results in response to the geographic search queries, and display navigation or travel directions from the user's current location or some other specified starting location to a selected destination location. The navigation or travel directions may be provided for several different modes of transportation (e.g., walking, biking, driving, public transit, ride services, a recommended mode of transportation that may include multiple modes of transportation for arriving at the destination location based on the shortest duration, distance, or lowest cost, etc.). When the user selects a ride services mode of transportation or selects multi-modal travel directions that include a segment covered by a ride service and selects a ride service provider/type of ride service, the mapping application 128 proceeds to the sign-in state 604.

In the sign-in state 604, the mapping application 128 determines whether the user is signed into a client account 616 associated with a provider of the mapping application 128. If the user is not signed in, the mapping application 128 may provide user controls for entering user login information, such as a username and password to sign into the client account 616. When the user signs in, the mapping application 128 signs the user into a user profile associated with the third-party provider 618 that provides the ride service. In some embodiments, the user may sign into the third-party provider using the client account 616 associated with the provider of the mapping application 128. When the user is signed into the third-party provider, the mapping application 128 invokes the ride service API 208 to retrieve a ride ID associated with the user profile to determine whether there is a ride currently in progress. If there is a ride currently in progress, the mapping application 128 transitions to the restore state 608. On the other hand, if there is no ride ID, the mapping application 128 proceeds to the confirm/book state 606.

In the confirm/book state 606 and more specifically the confirm state 620, the mapping application 128 presents a pick-up request display, that includes a user control for selecting a pick-up location, similar to the display as shown in FIG. 12A. The pick-up request display may also include user controls for selecting or adding payment methods. For example, the mapping application 128 may retrieve payment methods for the user that are stored with the ride service provider via the ride service API 208. The mapping application 128 may display masked indications of each of these payment methods for the user to choose from and may display an additional user control for the user to enter a new payment method. In some embodiments, when the user has selected a pick-up location and payment method, the mapping application 128 may present a user control such as a "Confirm Pick-up" button, which when selected, transitions the mapping application 128 to the book state 622.

In the book state 622, the mapping application 128 requests ride services from the ride service provider from the pick-up location to the destination location via the ride service API 208. The ride service API 208 then communicates with the ride service provider to select a driver for the ride. For example, the ride service provider may broadcast a message to each of the drivers within a threshold distance of the pick-up location and may select the first driver to respond to the broadcasted message. In any event, the ride service API 208 may then provide a ride ID to the mapping application 128 and the mapping application 128 proceeds to the ride in progress state 626. In the ride in progress state, the mapping application 128 continuously or periodically (e.g., every 5-10 seconds) calls a get ride status function 612 to receive status information regarding the status of the ride by providing the ride ID to the ride service API 208. In response, the ride service API 208 provides status information to the mapping application 128. The status information may include: waiting for the driver to accept the ride 628, waiting for the driver to arrive at the pick-up location 630, ride in progress 632, and ride completed 634.

During the waiting for the driver to arrive at the pick-up location 630 and ride in progress 632 states, the ride service API 208 may also return a current location of the driver for display via the mapping application 128. In this manner, the mapping application 128 may present an indication of the driver on the map display along with the pick-up location or destination location for the user to view the driver's progress to the pick-up location or on the route to the destination location. Additionally, during the waiting for the driver to accept the ride 628, waiting for the driver to arrive at the pick-up location 630, and ride in progress 632 states, the mapping application 128 may present a user control for cancelling the ride which when selected, may cause the mapping application 128 to provide a cancel request to the ride service provider via the ride service API 208 to cancel the ride. The mapping application 128 may also present a user control for modifying the destination location which when selected, may cause the mapping application 128 to provide a modify destination request to the ride service provider via the ride service API 208.

Once the user is dropped off at the destination location, the mapping application 128 proceeds to the completed state 632. In the completed state 632, the mapping application 128 may present a summary of the ride including a final price of the ride, a user control for rating the driver, or any other suitable information regarding the rate. Then the mapping application 128 may return to the initial state 602.

As mentioned above, the mapping application 128 transitions to the restore state 608 when the user signs into the third-party provider and there is a ride currently in progress. For example, the user may have exited the mapping application 128 and then reopened it while requesting a ride. In the restore state 608, the mapping application 128 proceeds to the ride in progress state 626 and continuously or periodically (e.g., every 5-10 seconds) calls a get ride status function 612 to receive status information regarding the status of the ride.

In addition to providing ride services, the mapping application 128 provides multi-modal modes of transportation for navigating a user to her destination location. For example, the user may select a recommended mode of transportation that may include multiple modes of transportation for providing an optimal route to the destination location based on the shortest duration, distance, lowest cost, etc. In some embodiments, the user may provide preferences, such as "Avoid highways," "Utilize public transit," "Avoid walking directions at night," "Lowest cost," "Shortest duration," may indicate a preferred mode of transportation, a preferred ride service provider, and/or preferred ride service type (e.g., a carpooling ride service), or may provide any other suitable preferences. Accordingly, the mapping application 128 may present one or several optimal routes to the destination location using one or several modes of transportation and according to the user's preferences.

In some embodiments, the mapping application 128 provides a request for navigation directions using a recommended mode of transportation to the server device 104 including a starting location, a destination location, and user data including the user's preferences. The server device 104 may retrieve map data, navigation data, traffic data, etc. to generate routes from the starting location to the destination location. Also in some embodiments, the server device 104 may invoke ride service APIs 208 to retrieve ride service data for ride service providers, such as estimated wait times and price estimates for particular segments of the route. For example, an optimal route may include a ride service to and/or from a public transit stop. More specifically, the server device 104 may generate a recommended multi-modal route that includes a first public transit stop one mile from the user's starting location and a second public transit stop one miles from the user's destination location. The recommended multi-modal route may include a ride service from the starting location to the first public transit stop and another ride service from the second public transit stop to the destination location. In another example, the recommended multi-modal route may include walking directions from the starting location to the first public transit stop or from the second public transit stop to the destination location.

By communicating with the ride service providers, the server device 104 may identify a ride service provider and/or ride service type that minimizes cost and/or wait time. When the user indicates a preferred ride service provider or ride service type, the server device 104 may retrieve ride service data from the preferred ride service provider and include the preferred ride service provider in the route. The server device 104 may then generate one or several recommended multi-modal routes and provide the recommended routes to the mapping application 128 for the user to select one of the recommended routes and begin navigating to the destination location.

Figure 6:
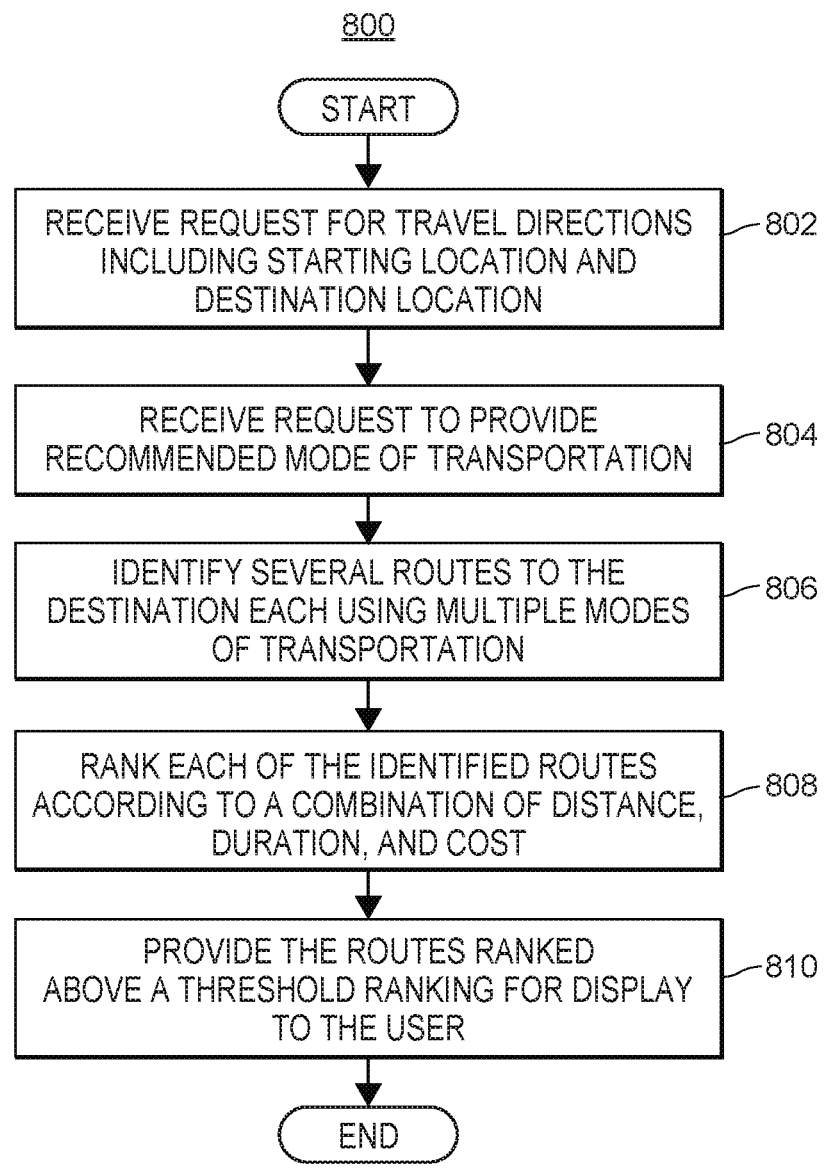
FIG. 6 is an exemplary flow diagram for generating recommended multi-modal routes from a starting location to a destination location.

FIG. 6 illustrates a flow diagram of an example method 800 for generating recommended multi-modal routes from a starting location to a destination location. The method can be implemented in a set of instructions stored on a computer-readable memory and executable one or more processors of the server device 104. In other embodiments, the method can be implemented by an application executable on the client computing device 102, or a combination of the server device 104 and the client computing device 102.

At block 802, a request for travel directions is received that includes a starting location and a destination location. The request for travel directions may be received from a mapping application 128 executing on a user's client computing device 102. The user may provide a destination location by for example selecting a search result in response to a geographic search query, entering a destination location, touch-selecting a destination location on a map display, or in any other suitable manner. The starting location may be the user's current location or another location provided by the user.

At block 804, the mapping application 128 may also provide a request to receive the travel directions for a recommended mode of transportation. The recommended mode of transportation may include multiple modes of transportation. Additionally, in response to a request for travel directions using a recommended mode of transportation, the server device 104 may provide multiple routes to the destination location, each involving one or more modes of transportation for the user to choose from. When requesting travel directions using a recommended mode of transportation, the mapping application 128 may provide user preferences for the recommended routes, such as "Avoid highways," "Utilize public transit," "Avoid walking directions at night," "Lowest cost," "Shortest duration," a preferred ride service provider and/or preferred ride service type (e.g., a carpooling ride service), or any other suitable user preferences.

In response to receiving the request for travel directions using a recommended mode of transportation, the server device 104 may identify several routes from the starting location to the destination location, each involving one or more modes of transportation (block 806). In some embodiments, a route may include a first segment using a ride service mode of transportation and a second segment using another mode of transportation, such as walking, driving, biking, public transit, etc. For example, the server device 104 may identify a first route which includes driving from the starting location to the destination location or ordering a ride service. The server device 104 may identify a second route which includes walking to a train station, taking a train from a first train stop to a second train stop, and ordering a ride service from the second stop to the destination location. Moreover, the server device 104 may identify a third route which includes biking from the starting location to a bus station, taking a bus from a first bus stop to a second bus stop, walking from the second bus stop to a train station, taking a train from a first train stop to a second train stop, and walking to the destination location. In other embodiments, the mapping application 128 generates the travel directions using cached map data stored in a local memory of the client computing device 102, or generates travel directions using cached map data for segments of the route that do not include a ride service.

In some embodiments, identified routes may include a particular ride service provider and/or ride service type. For example, some ride service providers may include a shuttle ride service type and a route may include taking a train to a stop near a shuttle pick-up location and then taking the ride service from the shuttle pick-up location to a shuttle stop walking distance from the destination location. In this manner, the user may save time and reduce costs when the shuttle pick-up location can be timed with the train stop.

At block 808, each of the identified routes are ranked or scored according to an optimization technique. For example, the identified routes may be ranked or scored according to one or several factors, such as distance, duration, cost, user data including user preferences, etc. For example, the identified routes may be ranked to minimize an overall time of travel to the destination location. In another example, the identified routes may be ranked to minimize an overall price of travelling to the destination location.

In yet another example, each identified route may receive a distance score, a duration score, a cost score, a user preferences score, or any other suitable score, and the scores may be weighted, aggregated, or combined in any suitable manner to generate an overall score for each route. The routes may then be ranked in order of their respective scores to minimize cost, time, and/or distance. In some embodiments, routes that do not meet the user preferences may be filtered out or may receive a score of zero. In this manner, the recommended routes and/or the ride service provider/ type of ride service may be ranked/selected in view of user data. For example, if the user indicates he would not like to walk at night, any routes that include a walking segment after a threshold time period may be filtered out or ranked at the bottom. The cost may be determined based on the cost for using a particular public transit system, or the cost for using a particular ride service provider and/or ride service type. For example, the server device 104 may invoke one or several ride sharing APIs 208 to determine price estimates for using a particular ride service provider and/or ride service type for a segment of a route.

In addition to ranking the identified routes, the server device 104 may rank candidate rides, where each candidate ride corresponds to a particular ride service provider and ride service type. The candidate rides may be ranked or scored according to one or several factors, such as distance, duration, cost, user data including user preferences, etc. For example, the candidate rides may be ranked to minimize the wait time for the driver to arrive at the pick-up location. In another example, the candidate rides may be ranked to minimize an overall price of travelling to the destination location. The server device 104 may separately rank the candidate rides according to wait time, price, or any other suitable category. In some embodiments, the candidate rides may also be ranked according to user feedback data for the ride service providers. The user feedback data may include data indicate of past ratings or reviews of the ride service providers by riders.

Then at block 810, the server device 104 provides a set of routes or a listing of rides ranked above a threshold ranking (e.g., the top three highest ranking routes) as recommended routes or rides to the mapping application 128 for the user to choose from. For example, indications of each of the top three highest ranking routes may be provided in a region of the map display (e.g., as a series of icons representing the modes of transportation for segments of the route) and the user may choose one of the routes by touch-selecting an indication of a recommended route. In other embodiments, the server device 104 selects one route (e.g., the highest ranking route) and provides the selected route to the mapping application 128. In an exemplary scenario, the mapping application 128 displays three routes, where a first route includes ordering a taxi ride service provided by Rider from the starting location (e.g., the user's current location) to a train station, taking a train from a first train stop to a second train stop, and walking to the destination location. A second route includes walking to a shuttle pick-up location for a shuttle ride service provided by DriverCo, taking the shuttle ride service to a second shuttle stop/pick-up location, and walking to the destination location. A third route includes walking to a bus station, taking a bus from a first bus stop to a second bus stop, walking to a train station, taking a train from a first train stop to a second train stop, and ordering a carpooling ride service provided by Rider from the second train stop to the destination location.

When the user selects one of the recommended multi-modal routes which include a segment covered by a ride service or selects a route using the ride service mode of transportation, the mapping application 128 may invoke one or several ride service APIs 208 to communicate with several ride service providers. For example, a route may include taking a train from a first train stop to a second train stop, and ordering a ride service from the second stop to the destination location. In this example, the second stop may be the pick-up location for the ride service and the destination location may be the drop-off location. The mapping application 128 may identify an estimated time in which the user will arrive at the second train stop and thus the pick-up location. Accordingly, the mapping application 128 may request the ride to begin at the estimated time at the pick-up location or within a threshold time period of the estimated time (e.g., within five minutes, ten minutes, etc.).

Also when the user selects one of the recommended multi-modal routes, the mapping application 128 presents a visualization of the route on the map display. For example, the visualization may include indications of the starting and destination locations, such as pins at the two locations. The visualization may also include an indication of the route from the starting location to the destination location. For example, each of the streets, roads, highways, and maneuvers along the route may be highlighted or indicated in any suitable manner. Also, each segment of the route may include an indication of a respective mode of transportation for the corresponding segment. For example, a first segment of the route may be denoted with dashed lines indicating walking directions for the first segment and a second segment of the route may be denoted with a solid line indicating driving directions for the second segment.

In some embodiments, when the user selects a recommended multi-modal route that includes a particular ride service provider and ride service type, the mapping application 128 may only present ride service data for the selected ride service provider and ride service type. For example, when the user or the server device 104 selects a particular ride from several candidate rides, the mapping application 128 may request ride service data for the selected ride. In other embodiments, the mapping application 128 presents ride service data for each ride service provider and ride service type to allow the user another opportunity to select the ride service provider and ride service type.

Figure 7:
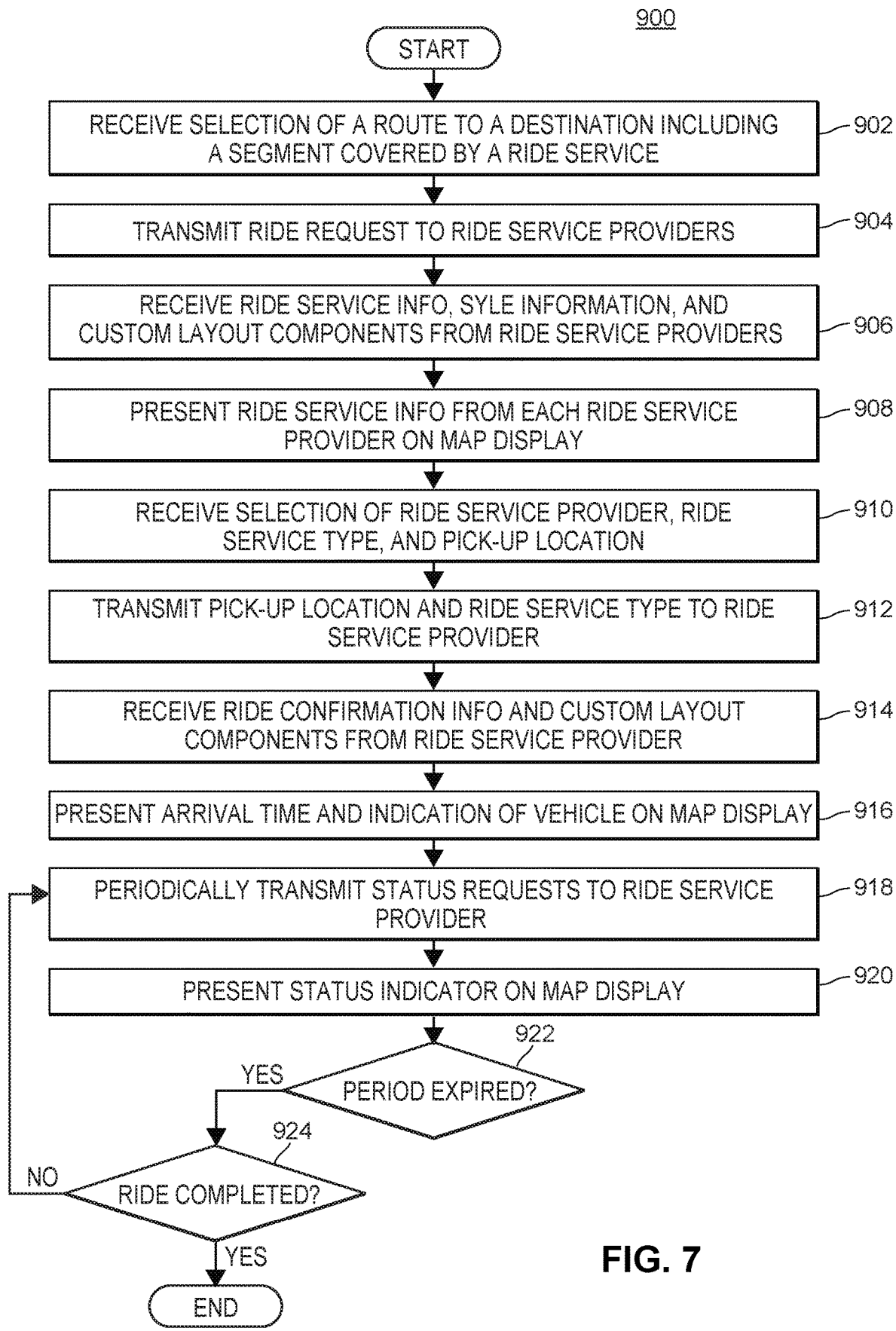
FIG. 7 is an exemplary flow diagram for providing ride services within a mapping application without directing the user to a separate ride service application.

FIG. 7 illustrates a flow diagram of an example method 900 for providing ride services within a mapping application without directing the user to a separate ride service application. The method can be implemented in a set of instructions stored on a computer-readable memory and executable one or more processors of the client computing device 102. For example, the method can be implemented by an application stored on the client computing device, such as the mapping application 128. In other embodiments, the method can be implemented by the server device 104, or a combination of the client computing device 102 and the server device 104.

At block 902, a route from a starting location to a destination location is selected that includes at least a segment covered by a ride service. For example, the mapping application 128 may present several recommended multi-modal routes to the destination location and a user may choose one of the recommended multi-modal routes by for example, touch-selecting an indication of the route, as described above with reference to FIG. 6. In another example, the mapping application 128 may include a user control for requesting travel directions to a selected destination location. When the user requests travel directions via the user control, the mapping application 128 may provide user controls for selecting a mode of transportation including a ride service mode.

When the ride service mode is selected, the mapping application 128 may invoke one or several ride service APIs 208 to communicate with respective ride service providers for requesting rider services (block 904). The mapping application 128 may provide a ride service request using each ride service API 208 along with a current location of the user and a destination location, for example. The ride service API 208 may then forward the ride service request to a corresponding ride service application 126 or a ride service provider server 106, which may in turn provide ride service information to the ride service API 208 which is then forwarded to the mapping application 128 (block 906). Ride service information may include types of ride services available, an estimated time for arrival of a ride through each type of ride service, an estimated price for each type of ride service, an estimation of the vehicles/drivers in the area, etc.

In addition to providing ride service information, the ride service provider, via the ride service API 208, may provide style or visualization information and custom layouts for presenting the ride service information on the map display, for presenting other elements on the map display, or for rendering any suitable visualization of the ride on the map display. This is described in more detail below with reference to FIGS. 9-13B. More specifically, the mapping application 128 may retain control over some components on the map display while allowing the ride service provider to customize the layout for other components on the map display. For example, the mapping application 128 may retain control over the base map included within the map display, but may allow the ride service provider to customize the search bar overlaying the base map at the top of the map display or the rectangular layout overlaying the base map at the bottom of the map display. The customized layouts do not need to be at the top or bottom of the map display and the ride service provider may also customize the location of the layouts within the map display. In addition to customizing layouts, the ride service provider may provide style information to adjust the style of elements on the map display controlled by the mapping application 128. For example, the ride service provider may provide style or visualization information for rendering elements in the base map, such as a background color for the base map, colors for highways roads, and streets, a font size, color, and type for map labels, a color scheme, line thickness, or stoke type for the base map, a graphic such as a vehicle icon representing a current location of a vehicle on the map, an icon representing the user's current location, a pick-up location icon representing the pick-up location, a drop-off location icon representing the drop-off location, a current orientation icon representing the current orientation of the client computing device, or any other visual attributes.

Figure 9:
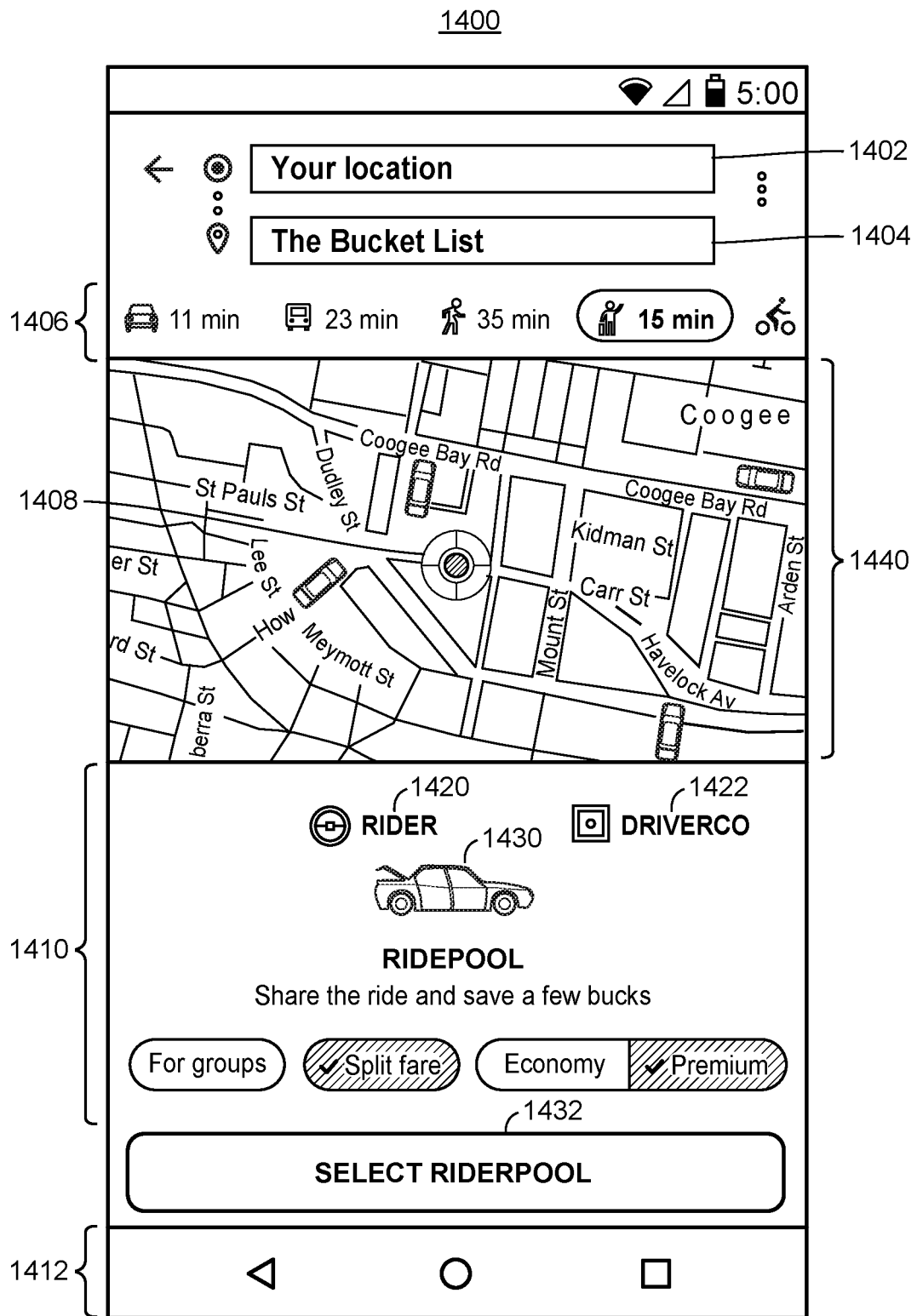
FIG. 9 is an exemplary display for selecting a ride service provider in a mapping application.

In any event, the mapping application 128 may then present the ride service information on the map display (block 908), similar to the display as shown in FIG. 9. More specifically, for each ride service provider, the mapping application 128 may present an indication of the ride service provider, such as the name and logo for the ride service provider. The mapping application 128 may also present indications of the ride service types provided by the ride service provider (e.g., a carpooling ride service, a taxi ride service, a limo ride service, a shuttle ride service, an extra-large vehicle service, etc.) as well as price and wait time estimates for each ride service type. When the mapping application 128 presents ride service information for multiple ride service providers on the map display, the user may select one of the ride service providers via a user control such as touch-selecting the indication of the ride service provider. In response to selecting the ride service provider, the mapping application 128 may present the indications of the ride service types provided by the selected ride service provider as well as the price and wait time estimates for each ride service type. The user may also select a ride service type via a user control such as touch-selecting the indication of the ride service type.

Additionally, the mapping application 128 may present the ride service information for each of the ride service providers with the respective style or visualization information and custom layouts from the corresponding ride service provider. Accordingly, the mapping application 128 may re-render the map display in according with the received style or visualization information. In some embodiments, when the user selects one of the candidate ride service providers, the mapping application 128 adjusts the map display to include the style information and custom layouts for the selected ride service provider. Then when the user selects another ride service provider, the mapping application 128 changes the map display to include the style information and custom layouts for the other ride service provider. For example, Rider may provide a pink vehicle icon, a dark blue background color for the base map, a triangular icon for representing the user's current location, and a customized layout for selecting the ride service type, where the user can provide a swipe gesture to view a new ride service type on the map display. The customized layout may also include icons to select between an economy or premium ride, to split the fare between several passengers on the ride, or to order a ride for a group, for example.

At block 910, the mapping application 128 receives a selection of a ride service provider and a ride service type. For example, the user may select a carpooling service named RiderPool from Rider by touch-selecting a user control, such as the RiderPool icon or a "Select RiderPool" button. As a result, the mapping application 128 presents a pick-up request display that includes a user control for selecting a pick-up location, similar to the display as shown in FIG. 12A. The user control may be a pin or other icon which is placed at a default pick-up location on the map display. For example, the default pick-up location may be the user's current location or may be a recommended pick-up location.

The user may then adjust the pick-up location by for example, dragging the user control to another location on the map display. In some embodiments, the pickup-request display includes an indication of the recommended pick-up location which remains on the pickup-request display when the user moves the pin to another location, so that the user can later select the recommended pick-up location. The indication of the recommended pick-up location may include an indication of the distance from the user's current location to the recommended pick-up location and indications of the time and cost savings associated with the recommended pick-up location. For example, in an area with several one-way streets, the mapping application 128 may recommend a pick-up location at a street that allows the driver to travel in the direction of the destination location, so that the driver does not need to make unnecessary turns after picking up the user. In another example, the recommended pick-up location may be determined based on traffic to avoid streets with heavy traffic in order to minimize cost. The mapping application 128 may identify a recommended pick-up location within a walking distance or threshold distance of the user's current location (e.g., within 500 or 1000 feet) to minimize the time and/or cost of the ride.

Additionally, the pick-up request display may include a preview of a three-dimensional street level view of the area around the pick-up location in a portion of the pick-up request display, so that the user may easily find the driver at the pick-up location. The preview may include a selectable user control, such that when selected, the pick-up request display presents a full screen view of the three-dimensional panoramic street level view of the area around the pick-up location. In some embodiments, the pick-up request display may overlay the street level view at a fixed predefined location on the base map, such as a location corresponding to the pick-up location. Moreover, the pick-up request display includes the style information and custom layouts from the ride service provider. For example, the ride service provider may provide a user control for confirming the pick-up location, such as a confirm button or other suitable icon and may indicate the position of the user control within the pick-up request display (e.g., below the base map at the bottom of the pick-up request display, above the base map at the top of the pick-up request display, etc.). In some embodiments, the pick-up request display or any other suitable display may also include a preview of a three-dimensional street level view of the area around the drop-off location. The preview may include a selectable user control, such that when selected, the corresponding display presents a full screen view of the three-dimensional panoramic street level view of the area around the drop-off location. In some embodiments, the corresponding display may overlay the street level view at a fixed predefined location on the base map, such as a location corresponding to the drop-off location.

Accordingly, the mapping application 128 identifies the pick-up location for the ride as the position of the user control for selecting a pick-up location when the confirmation user control is selected. At block 912, the mapping application 128 invokes the ride service API 208 to provide a pick-up request to the ride service provider along with the selected ride service type and pick-up location. In some embodiments, the mapping application 128 also provides a rider identifier such as user login information for logging the user into a user profile maintained by the ride service provider. For example, the user profile may include payment methods for the user, the name of the user, an email address of the user, a phone number of the user, a picture of the user for the driver to identify the user, a rating of the user, a ride ID for a ride currently in progress or ride the user is requesting, or any other suitable user profile information. The ride service API 208 may then forward the ride service request to a corresponding ride service application 126 or a ride service provider server 106, which may in turn provide ride confirmation information to the ride service API 208 which is then forwarded to the mapping application 128 (block 914).

The ride confirmation information may include a ride ID for retrieving status information for the ride, driver identification information for the selected driver (e.g., the name of the driver, the vehicle make, model, and color, a license plate number, etc.), an updated price estimate, an updated wait time, and an updated ride duration. The ride service provider, via the ride service API 208, may also provide style information and custom layouts for presenting the ride confirmation information on the map display or for presenting other elements on the map display.

At block 916, the mapping application 128 presents the ride confirmation information on the map display, similar to the display as shown in FIG. 13A. More specifically, the mapping application 128 may present an indication of an estimated wait time for the driver to arrive at the pick-up location (e.g., "Driver arriving in 1 minute"), an indication of the user's current location, an indication of the pick-up location, and an indication of the driver's location on the base map. The mapping application 128 may also present a user control for contacting the driver. Additionally, the mapping application 128 may present the ride confirmation information for the ride service provider with the received style information and custom layouts.

At block 918, the mapping application 128 periodically transmits status requests to the ride service provider, by for example invoking the ride service API 208 and providing the ride ID. Status requests may be transmitted every five seconds, every ten seconds, every 30 seconds, every minute, etc. (block 922). The ride service provider may then return a status, such as waiting for the driver to accept the ride, waiting for the driver to arrive at the pick-up location, ride in progress, ride completed, or any other suitable status. When the status is waiting for the driver to arrive at the pick-up location or ride in progress, the ride service provider may also return the location of the driver. The mapping application 128 then presents a status indicator and/or the location of the driver on the map display (block 920). For example, when the status is waiting for the driver to accept the ride, the map display may include a banner indicating that a driver has not accepted the ride. When the status is waiting for the driver to arrive at the pick-up location, the map display may include a banner indicating the estimated wait time for the driver to arrive at the pick-up location and an indication of the driver's location on the base map, such as a vehicle icon at the driver's location. Furthermore, when the status is ride in progress, the map display may include an indication of the driver's location on the base map. The mapping application 128 may continue to transmit status requests until the status is ride completed (block 924).

In some scenarios, a user may transition from the ride service portion of the mapping application 128 to map views of other geographic areas, to search for points of interest or other locations, or to perform any other mapping functions while ordering the ride service or on the ride. When the user transitions to other mapping functionality, the mapping application 128 may continue to receive status information regarding the status of the ride from the ride service provider. In some embodiments, the mapping application 128 presents a banner overlaying the map display, where the banner indicates that status of the ride. For example, the banner may state, "Ride in progress. 10 minutes away." The banner may include a user control, which when selected transitions the mapping application 128 back to the ride service portion to view details regarding the ride, change destination locations, cancel the ride, etc.

Figure 8:
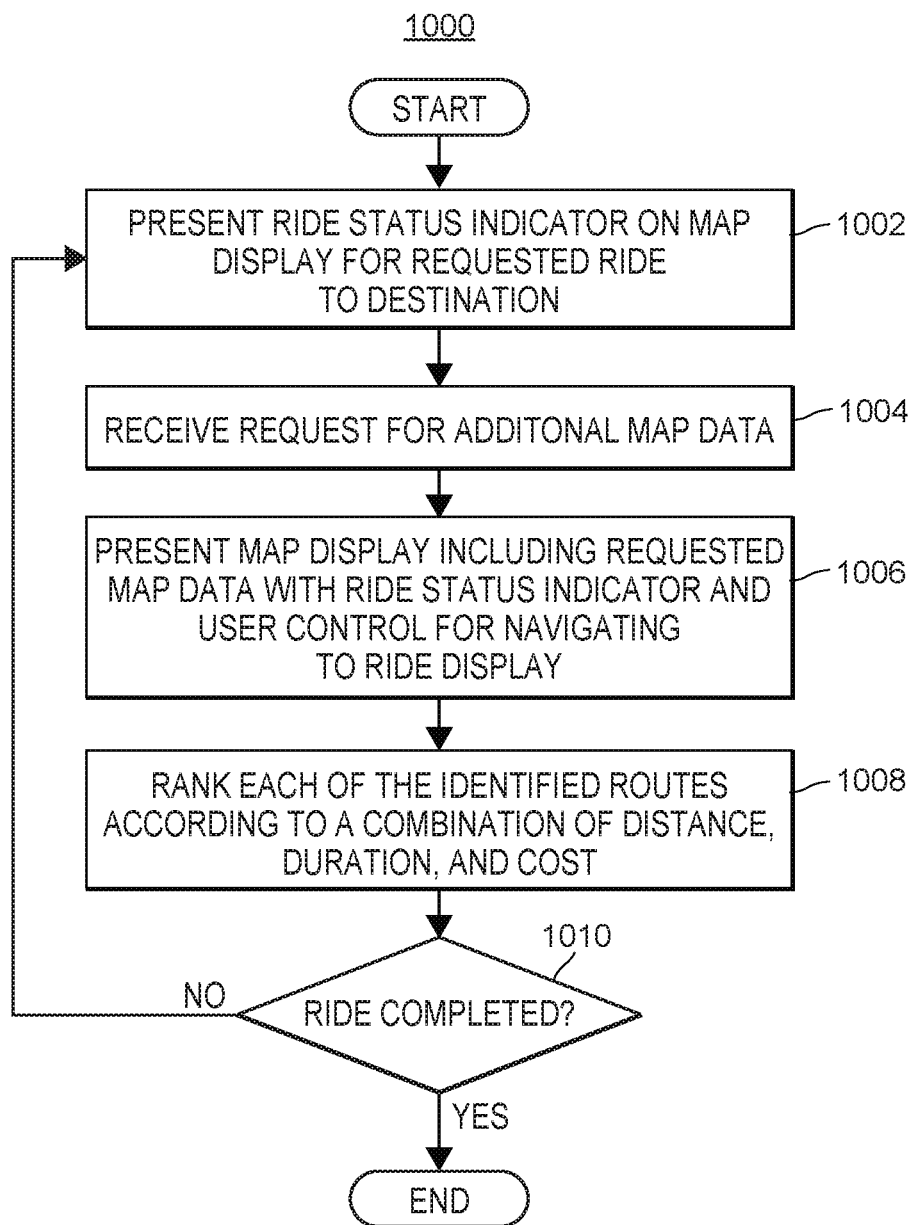
FIG. 8 is an exemplary flow diagram for presenting ride status information when the user transitions to other mapping functionality.

FIG. 8 illustrates a flow diagram of an example method 1000 for presenting ride status information when the user transitions to other mapping functionality. The method can be implemented in a set of instructions stored on a computer-readable memory and executable one or more processors of the client computing device 102. For example, the method can be implemented by an application stored on the client computing device, such as the mapping application 128. In other embodiments, the method can be implemented by the server device 104, or a combination of the client computing device 102 and the server device 104.

At block 1002, the mapping application 128 presents a status indicator or location of a driver for a requested ride to a destination location on the map display. The status may be waiting for the driver to accept the ride, waiting for the driver to arrive at the pick-up location, ride in progress, ride completed, or any other suitable status. Then at block 1004, the mapping application 128 receives a request for additional map data utilizing mapping functionality different from the ride service portion. For example, the request may be a geographic search query, a request to display a geographic area, or a request for travel directions to another destination location. In any event, the mapping application 128 presents the requested map data in the map display with a ride status indicator, such as a banner overlaying the map display that banner indicates that status of the ride (block 1006). The banner may include a user control, which when selected transitions the mapping application 128 back to the ride service portion to view details regarding the ride, change destination locations, cancel the ride, etc. In response to receiving a selection of the user control (block 1008), the mapping application 128 determines whether the ride has been completed (block 1010). If the ride has not been completed, the mapping application 128 transitions back to the ride service portion (block 1002).

Figure 11A:
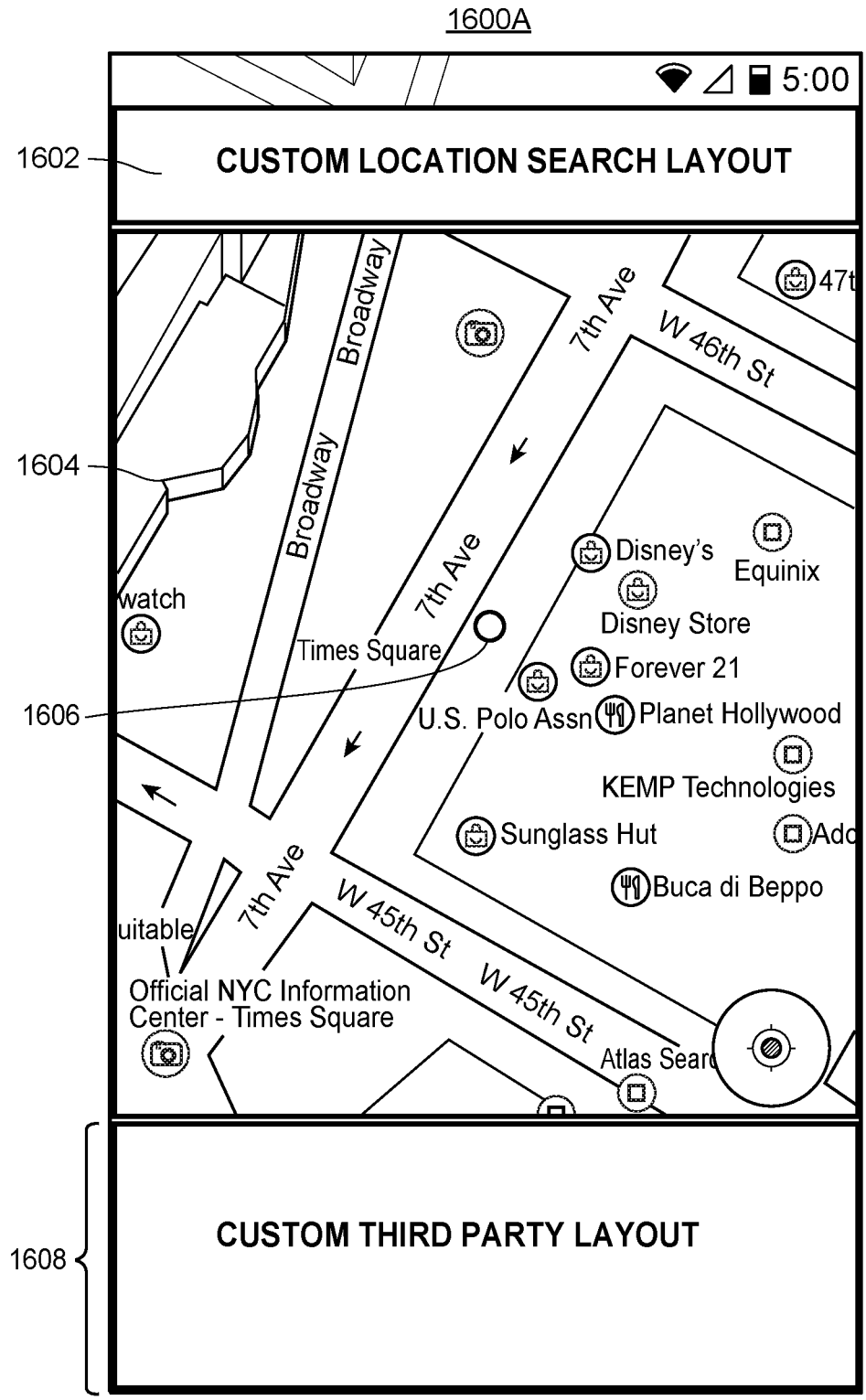
FIG. 11A is an exemplary ride request display in a mapping application that includes layout components which are customized by a ride service provider.
Figure 11B:
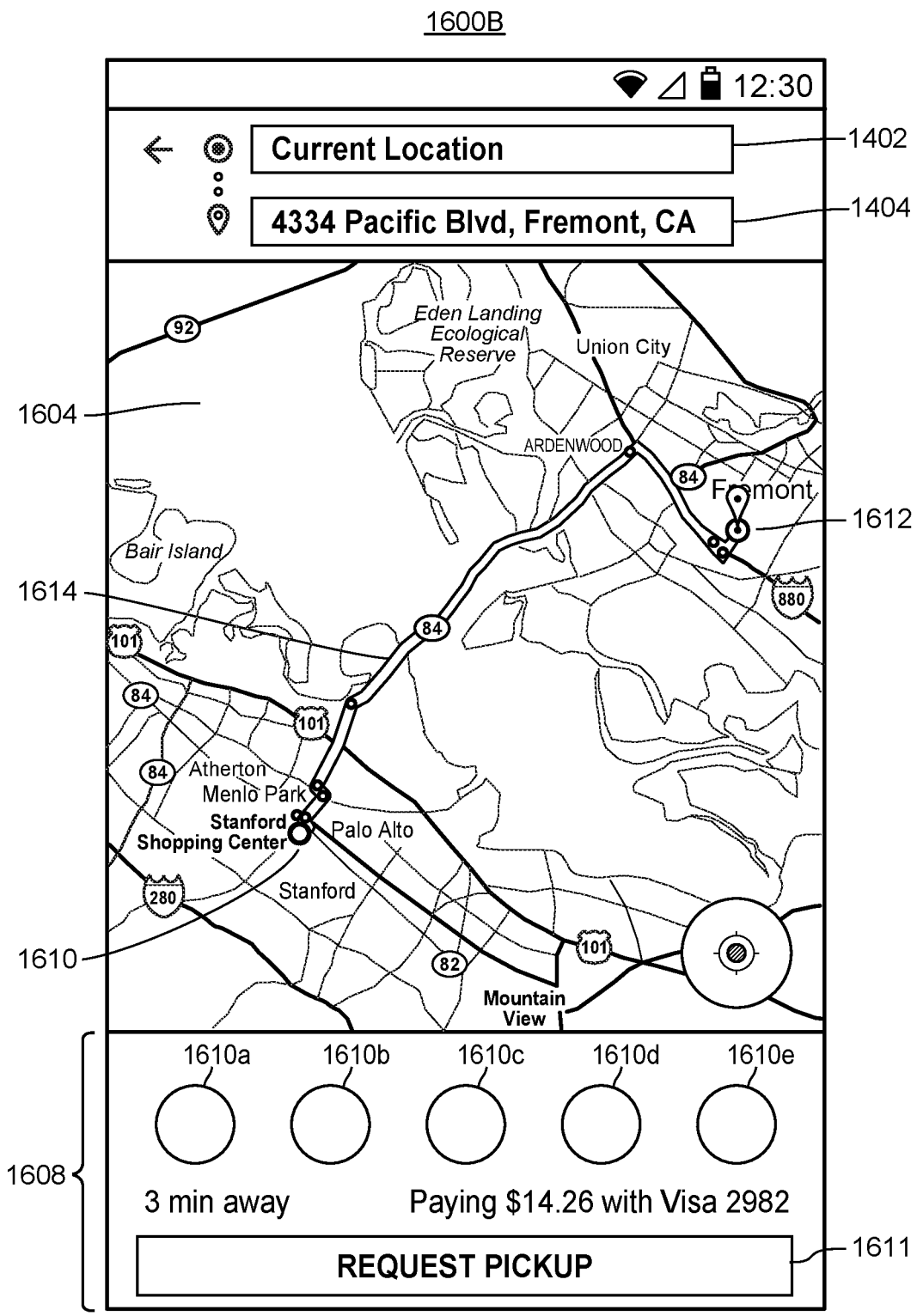
FIG. 11B is another exemplary ride request display in a mapping application that includes layout components which are customized by a ride service provider.
Figure 12B:
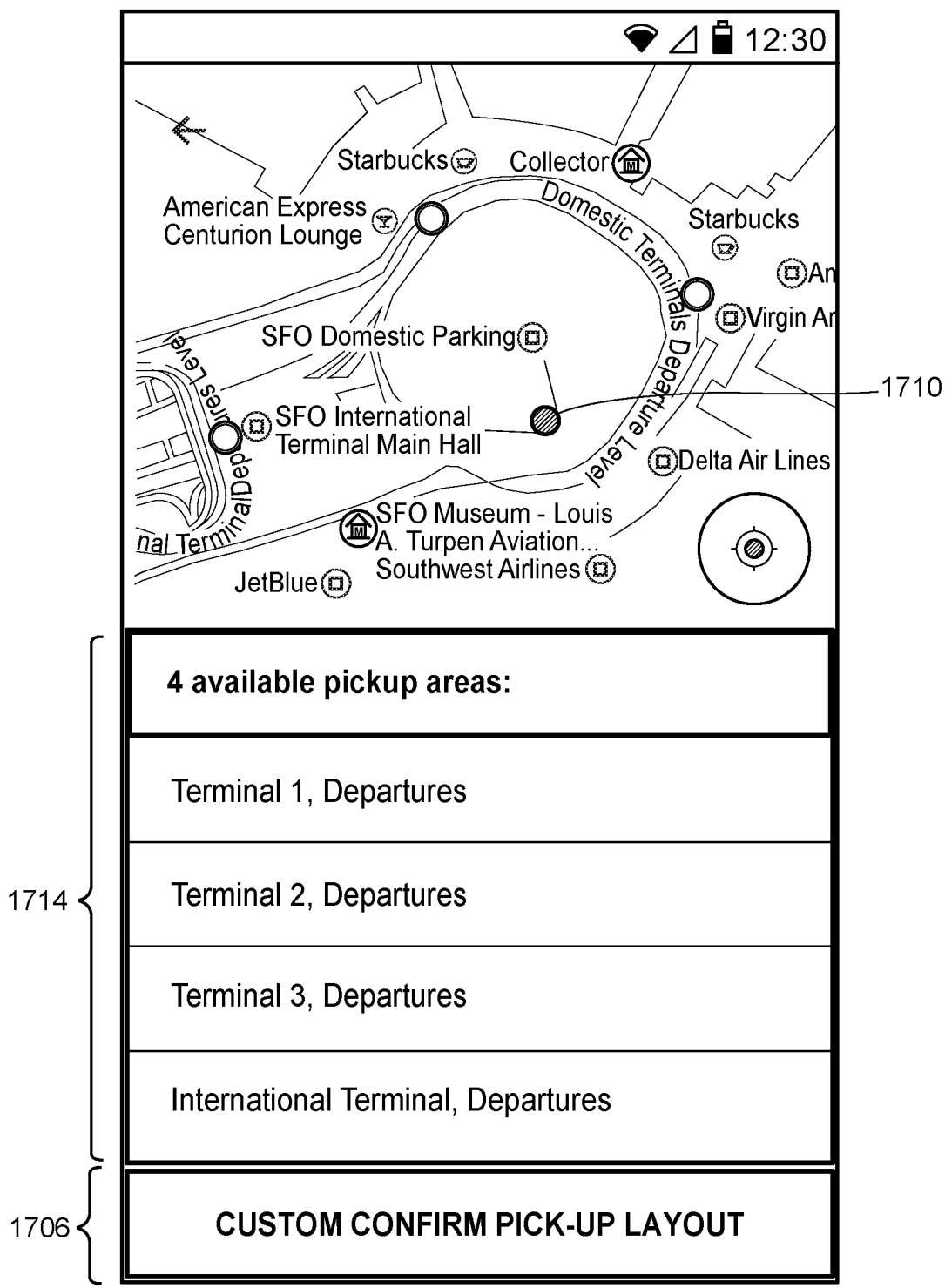
FIG. 12B is another exemplary pick-up request display for confirming a ride in a mapping application.
Figure 12C:
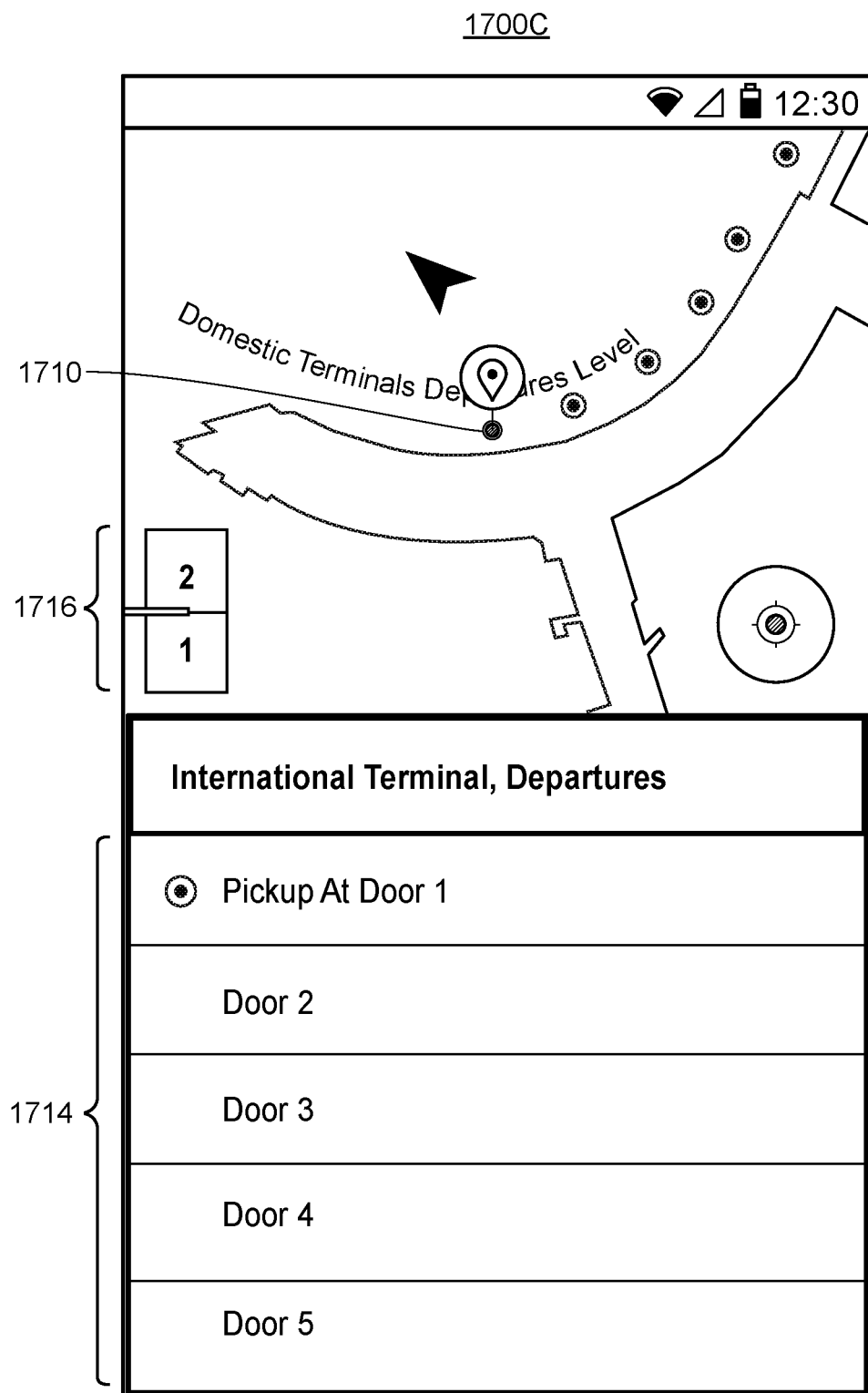
FIG. 12C is yet another exemplary pick-up request display for confirming a ride in a mapping application.
Figure 13B:
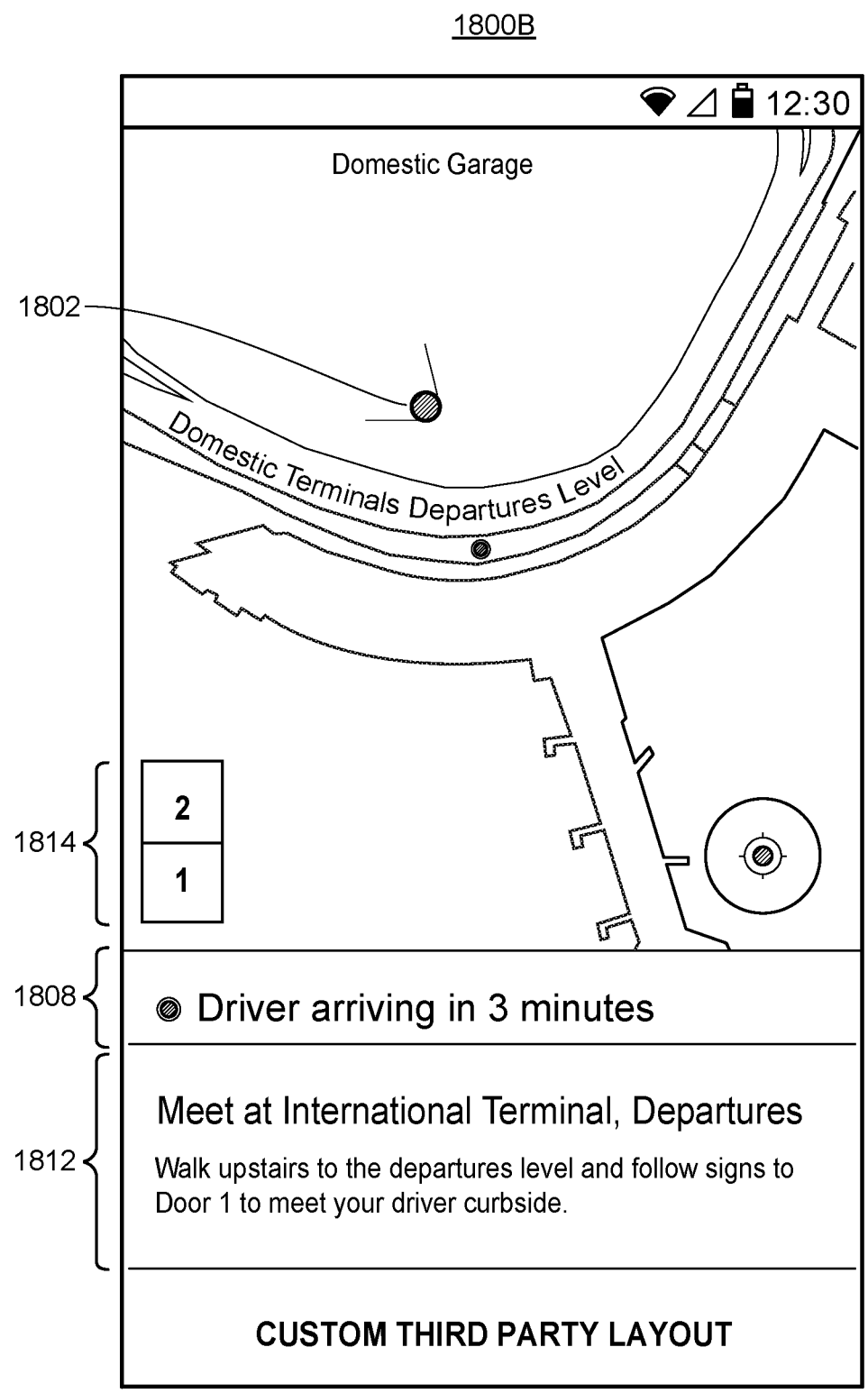
FIG. 13B is another exemplary wait for ride display presented in a mapping application.

FIGS. 9-13B illustrate example map displays 1400-1800B for providing ride services via a mapping application 128, such as ride request displays (FIGS. 9, 11A, 11B), pick-up request displays (FIGS. 10, 12A-C), and wait for ride displays (FIGS. 13A, 13B). Each of the map displays may be presented by the mapping application 128 and may include ride service data from one or several ride service providers obtained by invoking one or several ride service APIs. Still further, each of the map displays may include a base map, such as the base map 1440 as shown in FIG. 9 as well as customized layout components overlaying the base map and provided by ride service providers, such as the layout components 1602, 1608 as shown in FIG. 11A. Additionally, elements in the base maps may be stylized by the ride service providers. For example, a ride service provider may provide style information for elements included in the base map, such as a background color for the base map, colors for highways roads, and streets, a font size, color, and type for map labels, an icon representing an vehicle on the map, an icon representing the user's current location, a pin representing the destination location, etc.

FIG. 9 illustrates an exemplary display 1400 for selecting a ride service provider in a mapping application 128. The display 1400 may appear on a portable device such as the client computing device 102 as shown in FIG. 1. The display 1400 may include a user control 1402 for entering a starting location, a user control 1404 for entering a destination location, a user control 1406 for selecting a mode of transportation for traveling from the starting location to the destination location, and a base map 1440 centered 1408 around the user's current location. In some embodiments, the default starting location 1402 may be the user's current location. When the user selects a ride services mode of transportation 1442 or selects a recommended mode of transportation (not shown) having multi-modal travel directions that include a segment covered by a ride service, the display 1400 may include a customized layout 1410 overlaying the base map 1440 that presents indications of one or several ride service providers 1420, 1422.

In the example display 1400, the ride service providers include Rider 1420 and DriverCo 1422. Each of the ride service providers may provide customized layouts, and the display 1400 may present the layout customized by a selected ride service provider. For example, the user may select Rider 1420 by touch-selecting the indication of Rider on display 1400, and the display 1400 may present a layout 1410 customized by Rider. The customized layout 1410 includes an indication of a type of ride service 1430 (RiderPool) and selectable options for the RiderPool service, such as economy or premium, split the fare amongst the passengers, request RiderPool for a large group, etc. In the customized layout 1410, the user may perform a swipe gesture to view other types of ride services provided by Rider. However, this is merely one example layout for illustration purposes only. In other customized layouts, the display 1400 may include indications of each type of ride service 1430 at the same time, and the user may choose a type of ride service by touch-selecting the corresponding indication, for example. In any event, the customized layout 1410 also includes a user control 1432 to select the RiderPool service provided by Rider.

Figure 10:
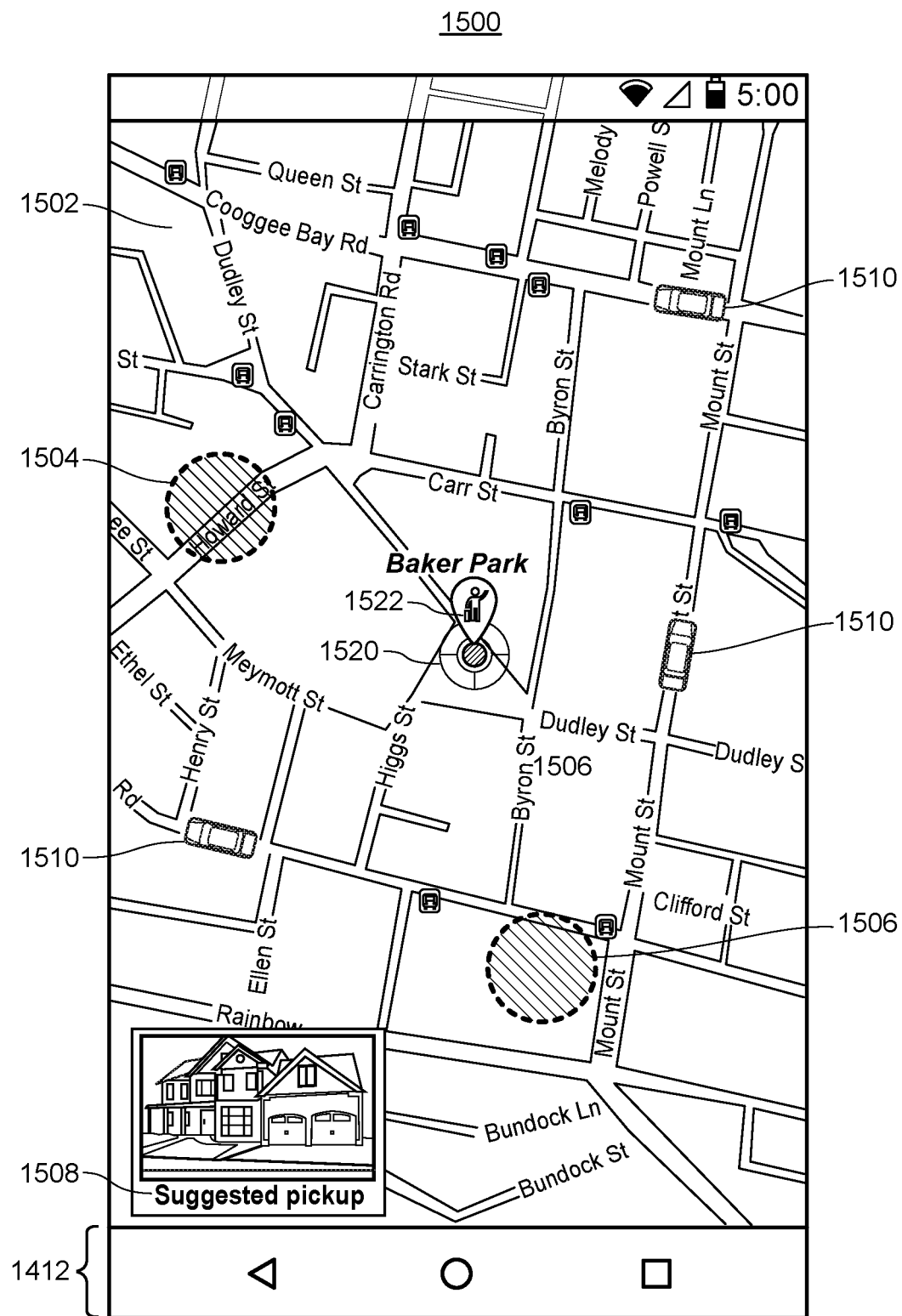
FIG. 10 is an exemplary display for selecting a pick-up location in a mapping application.

FIG. 10 illustrates an exemplary display 1500 for selecting a pick-up location in a mapping application 128. The display 1500 may appear on a portable device such as the client computing device 102 as shown in FIG. 1. As in FIG. 9, the display 1500 may include a base map 1502 centered around the user's current location 1520. The display may also include a user control 1522 such as a pin for selecting the pick-up location. In some embodiments, the default pick-up location may be the user's current location 1520 and the user may be able to drag the pin to select another location for the pick-up location. The display 1500 also includes indications of recommended pick-up locations 1504 and 1506 shown as circles. A preview of a three-dimensional street level view 1508 of the area around a pick-up location may be provided for one of the recommended pick-up locations, so that the user may easily find the driver at the pick-up location. The preview may include a selectable user control, such that when selected, the pick-up request display presents a full screen view of the three-dimensional street level view of the area around the pick-up location. Additionally, the display 1500 may include indications of the number of available vehicles 1510 employed by the ride service provider. While the locations of the vehicles on the map display may not be an accurate representation of the locations of the vehicles employed by the ride service provider, the number of vehicles on the map display may be used to show the user an approximation of the amount of vehicles in the area.

In some embodiments, the mapping application 128 identifies a landmark that corresponds to the pick-up location, or that is within a threshold distance of the pick-up location (e.g., 100 feet). The mapping application 128 then can include street-level imagery for the identified landmark in the three-dimensional street level view 1508. The mapping application 128 additionally or alternatively can provide via the interface an indication of the landmark, such as "Pickup in front of Disney Store." For example, the mapping application 128 can invoke the API exposed by the ride service provider to obtain geographic coordinates or the street address of the pick-up location (e.g., "123 Elm St.") and identify an appropriate landmark corresponding to these coordinates or this address. To this end, the mapping application 128 can transmit the coordinates and/or the street address to a map data server or, in some cases, rely on cached map data and street-level imagery. The map data server or, when cached data is used, the mapping application 128, can identify a landmark based on such properties as prominence (e.g., relative size of a landmark relative to other objects in the vicinity of the landmark, or difference in color between the landmark and nearby objects), visibility (e.g., availability of a direct line of sight between the pick-up location the landmark), popularity (e.g., amount of user-generated content such as photographs, reviews, etc. related to the landmark), or other suitable signals. Further, the map data server or the mapping application 128 in some embodiments can select the street-level imagery for the landmark location so as to face the landmark, regardless of the expected orientation of the user at the pick-up location relative to the landmark, for inclusion in the view 1508. For example, the map data server or the mapping application 128 can provide an image of a monument and generate the notification "pick up at 123 Elm St., across the street from the monument."

FIGS. 11A and 11B illustrate example ride request displays 1600A, 1600B in a mapping application 128 that include layout components which are customized by a ride service provider. The displays 1600A, 1600B may appear on a portable device such as the client computing device 102 as shown in FIG. 1. As mentioned above, ride service providers may provide customized layouts and style information to present in a mapping application 128. The ride request display 1600A includes a base map 1604, a custom location search component 1602 overlaying the base map 1604, and a custom third party layout component overlaying the base map 1608. The ride service providers may customize these components 1602, 1608 in any suitable manner and may adjust the position of the components 1602, 1608 within the ride request display 1600A. For example, Rider may request that the location search component 1602 is presented at the bottom of the ride request display 1600A. In one example, the location search component 1602 includes user controls for providing a starting location, a destination location, and a mode of transportation for providing travel directions to the destination location. The custom third party layout component 1608 includes selectable indications of each of the ride service types provided by the ride service provider as well as indications of price estimates and wait times for each ride service type. The custom components may also include icons, background colors, animations, or any other suitable graphical elements. FIG. 11B illustrates example custom layout components 1602, 1608 for the ride request display 1600B. In the ride request display 1600B, the custom location search component 1602 includes user controls for providing a starting location and a destination location. The custom third party layout component 1608 includes circular, selectable indications 1610a-e of the ride service types available from the ride service provider. The custom third party layout component 1608 also includes a price estimate, estimated wait time, and payment method as well as a user control 1612 for requesting the selected ride service provider and/or ride service type.

In response to receiving a selection of the user control 1612 for requesting the selected ride service provider and/or ride service type, the mapping application 128 presents a pick-up request display 1700A-C, as shown in FIGS. 12A-12C. The pick-up request displays 1700A-C may appear on a portable device such as the client computing device 102 as shown in FIG. 1. The pick-up request display 1700A includes a base map 1702, a pick-up location layout component 1704, and a pick-up confirmation layout component 1706. In some embodiments, the pick-up confirmation layout component 1706 is customizable by the selected ride service provider. The pick-up request display 1700A also includes an indication of the user's current location 1710, and a user control 1712 such as a pin for selecting the pick-up location. In some embodiments, the default pick-up location may be the user's current location 1710 and the user may be able to drag the pin to select another location for the pick-up location. The pick-up request display 1700A also includes a preview of a three-dimensional street level view 1708 of the area around the selected pick-up location or around a recommended pick-up location, so that the user may easily find the driver at the pick-up location. The preview may include a selectable user control, such that when selected, the pick-up request display 1700A presents a full screen view of the three-dimensional street level view of the area around the pick-up location.

FIG. 12B illustrates another example pick-up request display 1700B when the user 1710 is located at an airport, and there are several recommended pick-up locations. The recommended pick-up locations are shown in a location list 1714 as available pick-up areas. The user may select one of these pick-up locations and confirm the selection using the pick-up confirmation layout component 1706. FIG. 12C illustrates yet another example pick-up request display 1700C when the user 1710 is located at an airport. In addition to the location list 1714, the pick-up request display 1700C includes a user control 1716 for selecting one of several levels where the user may be picked up. For example, the location list 1714 may include a first set of recommended pick-up locations for a first level of a building, and a second set of recommended pick-up locations for a second level of a building.

In response to receiving a selection of the user control 1706 for confirming the pick-up location, the mapping application 128 presents a wait for ride display 1800A, 1800B, as shown in FIGS. 13A and 13B. The wait for ride displays 1800A, 1800B may appear on a portable device such as the client computing device 102 as shown in FIG. 1. The wait for ride display 1800A may include an indication of the user's current location 1802, an indication of the vehicle 1804 picking up the user, and an indication of the pick-up location. The wait for ride display 1800A may also include an arrival layout component 1808 that includes an indication of an estimated wait time for the driver to arrive at the selected pick-up location. Additionally, the wait for ride display 1800A includes a contact driver layout component 1810 with a user control for contacting the driver. In some embodiments, the contact driver layout component 1810 is customizable by the selected ride service provider. Also in some embodiments, the driver may be contacted via a SMS application or a chat application.

FIG. 13B illustrates another wait for ride display 1800B presented when the user 1802 is located at an airport. The wait for ride display 1800B includes an arrival layout component 1808 as well as additional instructions layout component 1812 for providing detailed walking direction to the pick-up location. As in FIG. 12C, the wait for ride display 1800B includes a user control 1814 for selecting one of several levels where the user may be picked up.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configured on a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 500, 800, 900, and 1000 may include one or more function blocks, modules, individual functions or routines in the form of tangible computer-executable instructions that are stored in a non-transitory computer-readable storage medium and executed using a processor of a computing device (e.g., a server, a personal computer, a smart phone, a tablet computer, a smart watch, a mobile computing device, or other personal computing device, as described herein). The methods 500, 800, 900, and 1000 may be included as part of any backend server (e.g., a map data server, a navigation server, or any other type of server computing device, as described herein), portable device modules of the example environment, for example, or as part of a module that is external to such an environment. Though the figures may be described with reference to the other figures for ease of explanation, the methods 500, 800, 900, and 1000 can be utilized with other objects and user interfaces. Furthermore, although the explanation above describes steps of the methods 500, 800, 900, and 1000 being performed by specific devices (such as a client computing device 102, and a server device 104), this is done for illustration purposes only.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for orienting a user within a map display through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method in a computing device for providing travel directions on a digital map, the method comprising:
providing, by one or more processors via a mapping application, an interactive digital map via a user interface;
receiving, via the user interface, a request to obtain travel directions to a destination;
obtaining, at the mapping application from a third-party provider of a separate ride service application for providing a ride service, ride information for a ride from a pick-up location to a drop-off location to traverse at least a portion of a route to the destination;
receiving, at the mapping application from the third-party provider of the ride service, visualization information for rendering a visualization of the ride on the digital map; and
generating, by the one or more processors, the visualization of the ride on the digital map in accordance with the received visualization information and the ride information.

2. The method of claim 1, wherein receiving the visualization information includes receiving a graphic for use as an icon in the visualization of the ride on the digital map.

3. The method of claim 2, wherein generating the visualization of the ride on the digital map includes using the received graphic as a vehicle icon to represent a current location of a vehicle providing the ride.

4. The method of claim 2, wherein generating the visualization of the ride on the digital map includes using the received graphic as a pick-up location icon to represent the pick-up location.

5. The method of claim 2, wherein generating the visualization of the ride on the digital map includes using the received graphic as a drop-off location icon to represent the drop-off location.

6. The method of claim 2, wherein generating the visualization of the ride on the digital map includes using the received graphic as a current orientation icon to represent the current orientation of the computing device.

7. The method of claim 2, wherein receiving the visualization information includes receiving styling information including at least one of (i) color scheme, (ii) line thickness, or (iii) stroke type, to be applied to the digital map, the method further comprising:
re-rendering the interactive digital map in accordance with the received styling information.

8. The method of claim 7, wherein re-rendering the interactive digital map includes modifying a background color of the digital map in accordance with the received styling information.

9. The computing device of claim 7, wherein to re-render the interactive digital map, the mapping application causes the computing device to modify a background color of the digital map in accordance with the received styling information.

10. The method of claim 1, further comprising allocating a portion of a screen in which the digital map is rendered to the third-party provider for rendering content related to the ride.

11. The method of claim 1, further comprising:
obtaining, from the third-party provider of the ride service, a custom layout component to overlay on the digital map, the custom layout component including at least one of:
a layout including indications of ride service types available from the third-party provider;
a layout having a user control for confirming a pick-up location; or
a layout having a user control for contacting a driver.

12. A computing device comprising:
a user interface;
one or more processors; and
a non-transitory computer readable medium storing a mapping application thereon that, when executed by the one or more processors, causes the computing device to:
provide an interactive digital map via a user interface,
receive, via the user interface, a request to obtain travel directions to a destination,
obtain, from a third-party provider of a separate ride service application for providing a ride service, ride information for of a ride from a pick-up location to a drop-off location to traverse at least a portion of a route to the destination,
receive, from the third-party provider of the ride service, visualization information for rendering a visualization of the ride on the digital map, and
generate the visualization of the ride on the digital map in accordance with the received visualization information and the ride information.

13. The computing device of 12, wherein to receive the visualization information, the mapping application causes the computing device to receive a graphic for use as an icon in the visualization of the ride on the digital map.

14. The computing device of claim 13, wherein to receive the visualization information, the mapping application causes the computing device to use the received graphic as a vehicle icon to represent a current location of a vehicle providing the ride.

15. The computing device of claim 13, wherein to receive the visualization information, the mapping application causes the computing device to use the received graphic as a pick-up location icon to represent the pick-up location.

16. The computing device of claim 13, wherein to receive the visualization information, the mapping application causes the computing device to use the received graphic as a drop-off location icon to represent the drop-off location.

17. The computing device of claim 13, wherein to receive the visualization information, the mapping application causes the computing device to use the received graphic as a current orientation icon to represent the current orientation of the computing device.

18. The computing device of claim 13, wherein to receive the visualization information, the mapping application causes the computing device to receive styling information including at least one of (i) color scheme, (ii) line thickness, or (iii) stroke type, to be applied to the digital map, and wherein the instructions cause the computing device to re-render the interactive digital map in accordance with the received styling information.

19. The computing device of claim 12, wherein the mapping application further causes the computing device to allocate a portion of a screen in which the digital map is rendered to the third-party provider for rendering content related to the ride.

20. The computing device claim 12, wherein the mapping application further causes the computing device to:
- obtain, from the third-party provider of the ride service, a custom layout component to overlay on the digital map, the custom layout component including at least one of:
- a layout including indications of ride service types available from the third-party provider;
- a layout having a user control for confirming a pick-up location; or
- a layout having a user control for contacting a driver.

* * * * *